(12) United States Patent
Nakagawa et al.

(10) Patent No.: US 8,306,338 B2
(45) Date of Patent: Nov. 6, 2012

(54) MOVING-PICTURE CODING DEVICE AND MOVING-PICTURE CODING METHOD

(75) Inventors: Akira Nakagawa, Kawasaki (JP);
Hidenobu Miyoshi, Kawasaki (JP);
Kimihiko Kazui, Kawasaki (JP);
Hisanari Kimura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1111 days.

(21) Appl. No.: 12/171,130

(22) Filed: Jul. 10, 2008

(65) Prior Publication Data

US 2009/0016621 A1    Jan. 15, 2009

(30) Foreign Application Priority Data

Jul. 13, 2007    (JP) ................................. 2007-184011

(51) Int. Cl.
*G06K 9/36*    (2006.01)
(52) U.S. Cl. ... 382/232; 382/236; 382/238; 375/240.16; 375/240.14
(58) Field of Classification Search ........................ None
See application file for complete search history.

(56) References Cited

U.S. PATENT DOCUMENTS

| | | | |
|---|---|---|---|
| 4,651,206 A | | 3/1987 | Ohki |
| 6,501,799 B1 * | | 12/2002 | Kohn .................... 375/240.16 |
| 7,839,931 B2 * | | 11/2010 | Wang et al. ............ 375/240.16 |
| 2002/0176500 A1 * | | 11/2002 | Bakhmutsky et al. ... 375/240.13 |
| 2004/0047420 A1 * | | 3/2004 | Nakagawa et al. ...... 375/240.16 |
| 2004/0264570 A1 * | | 12/2004 | Kondo et al. ........... 375/240.16 |
| 2005/0105618 A1 * | | 5/2005 | Booth et al. ............ 375/240.16 |
| 2005/0117651 A1 * | | 6/2005 | Wang et al. ............ 375/240.16 |
| 2006/0023788 A1 * | | 2/2006 | Otsuka et al. .......... 375/240.16 |
| 2007/0071398 A1 | | 3/2007 | Raveendran et al. |
| 2007/0110154 A1 | | 5/2007 | Wang et al. |
| 2007/0297511 A1 * | | 12/2007 | Chiu et al. .............. 375/240.16 |
| 2008/0225951 A1 * | | 9/2008 | Young et al. ........... 375/240.16 |
| 2009/0086820 A1 * | | 4/2009 | Hong et al. ............ 375/240.16 |
| 2011/0110430 A1 * | | 5/2011 | Guo et al. ............... 375/240.16 |

FOREIGN PATENT DOCUMENTS

| | | |
|---|---|---|
| EP | 1406448 A2 | 4/2004 |
| JP | 1994-101841 | 12/1994 |
| JP | 3791922 | 4/2006 |

OTHER PUBLICATIONS

Ye-Kui Wang et al., "Isolated Regions: Motivation, Problems, and Solutions", 3rd Meeting of the Joint Video Team (JVT) ISO/IEC MPEG & ITU-T VCEG, May 2002, pp. 1-13.
Extended European Search Report dated Dec. 22, 2011 issued in corresponding European Patent Application No. 08160137.9.

* cited by examiner

*Primary Examiner* — Vu Le
*Assistant Examiner* — Thomas A James
(74) *Attorney, Agent, or Firm* — Staas & Halsey LLP

(57) ABSTRACT

A moving-picture coding device that performs inter-field motion compensation prediction, includes a reference limit area determining unit that determines to select, for each reference picture, with respect to reference pictures used for coding, a luminance or chrominance reference limit area putting a limit to a reference picture used for generating a prediction picture of a luminance or chrominance of a coding target block belonging to the coding target picture limit area of the case upon each reference picture being previously coded; a selecting inhibit vector determining unit that determines, in a case of coding the coding block belonging to the coding target picture limit area, a selecting inhibit vector that inhibits selecting a luminance and the chrominance are comprised only of pixels of the luminance reference limit area and the chrominance reference limit area.

15 Claims, 29 Drawing Sheets

FIG.5
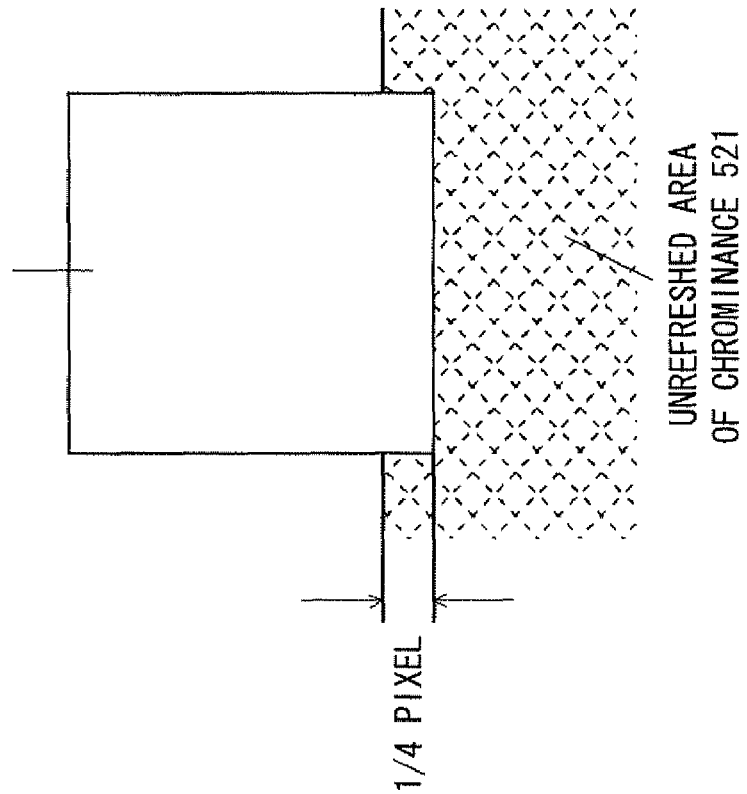
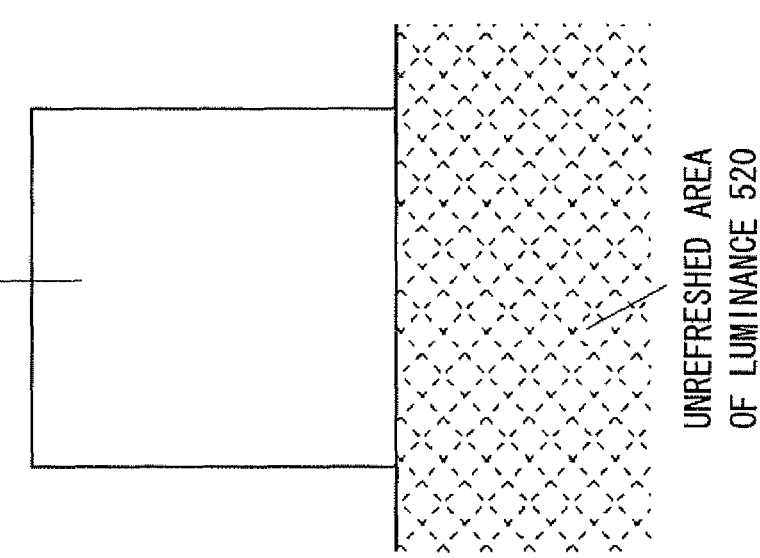

FIG.8

| PARITY OF CODING BLOCK 634 | PARITY OF REFERENCE PICTURE 635 | |
|---|---|---|
| TOP | TOP | THIRD SUB UNIT |
| TOP | BOTTOM | FOURTH SUB UNIT |
| BOTTOM | TOP | THIRD SUB UNIT |
| BOTTOM | BOTTOM | THIRD SUB UNIT |

SELECTING INHIBIT VECTOR DETERMINING UNIT 832

SECOND SELECTING UNIT 840

SELECTING INHIBIT VECTOR 636

SELECTING SIGNAL

THIRD SELECTING INHIBIT VECTOR DETERMINING SUB UNIT 841

FOURTH SELECTING INHIBIT VECTOR DETERMINING SUB UNIT 842

POSITION OF CODING BLOCK 633
CHROMINANCE REFERENCE LIMIT AREA 625
LUMINANCE REFERENCE LIMIT AREA 624
CODING TARGET PICTURE LIMIT AREA 622

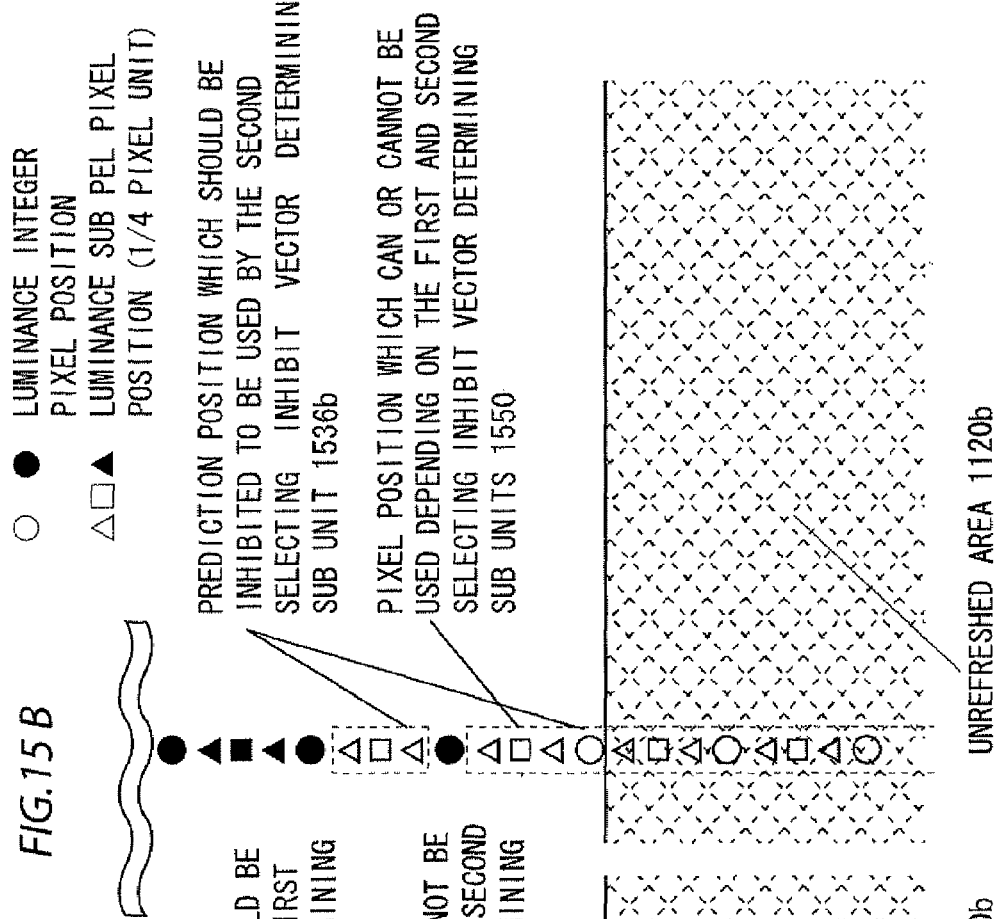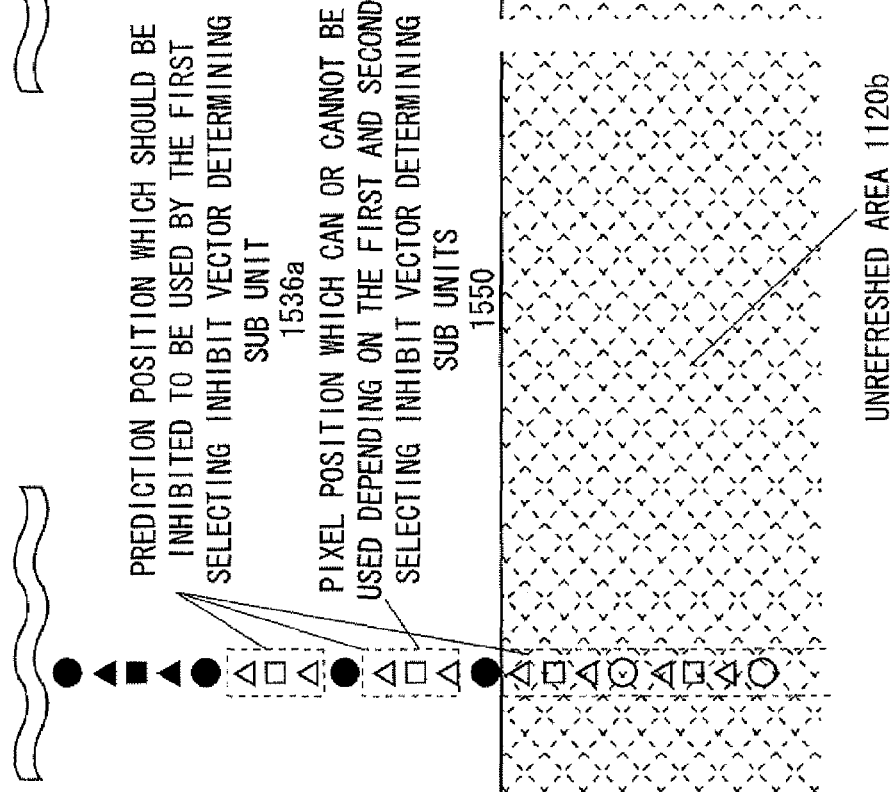

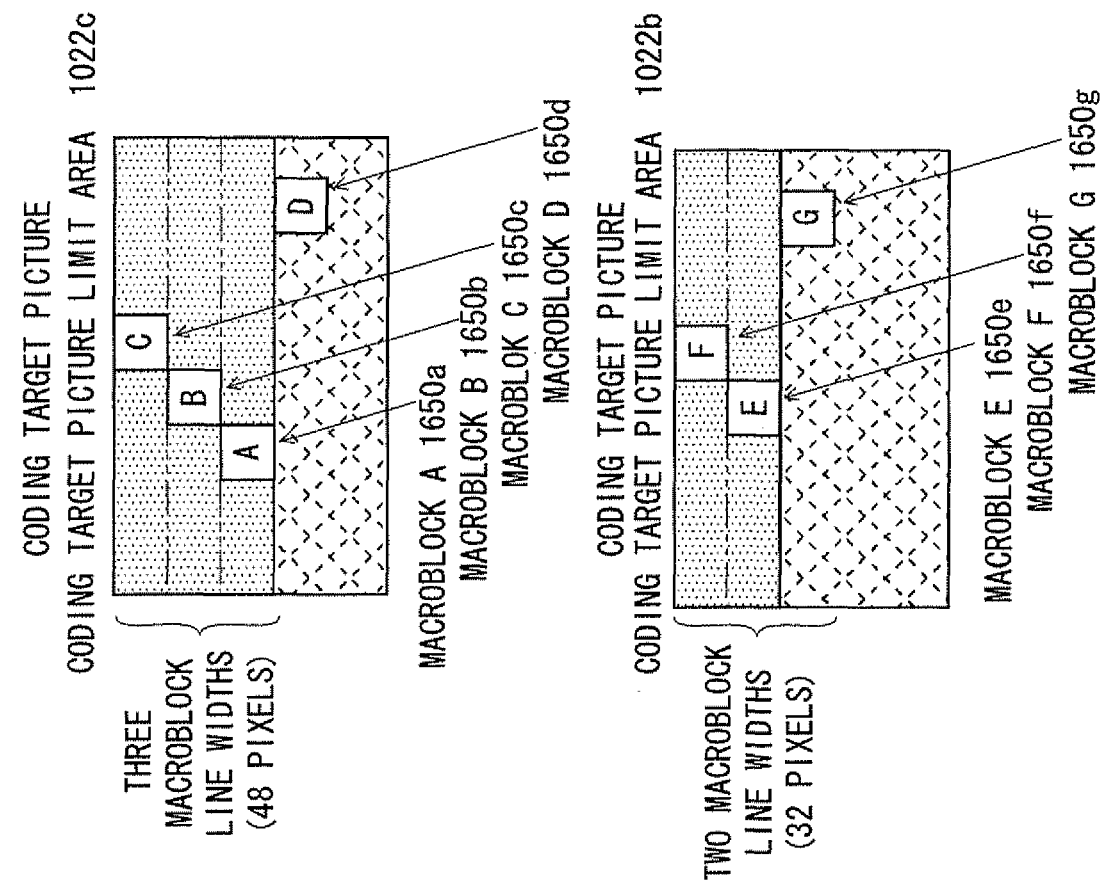
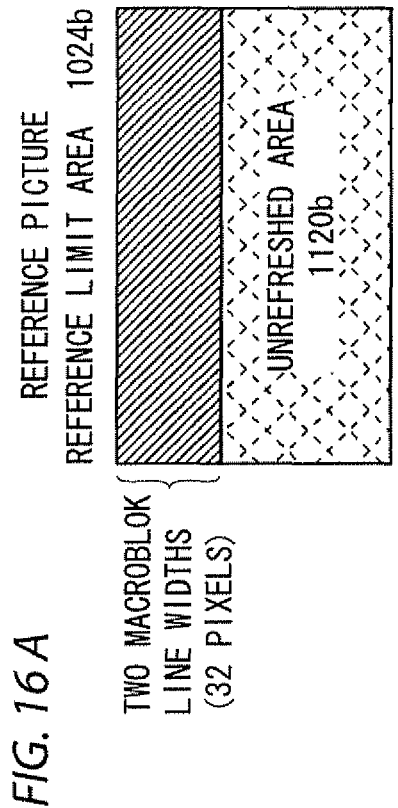
FIG. 16A
FIG. 16B

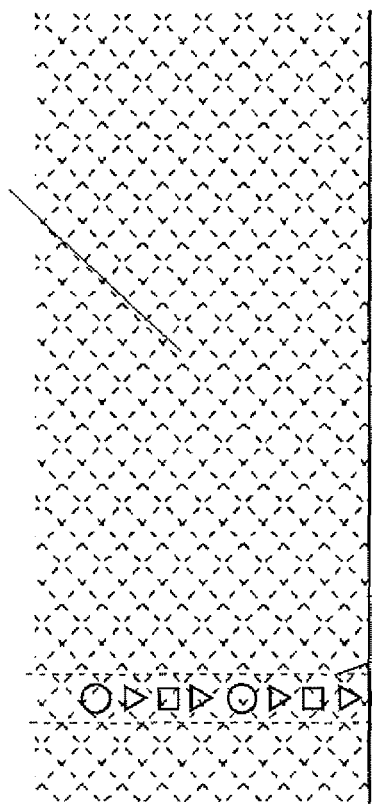

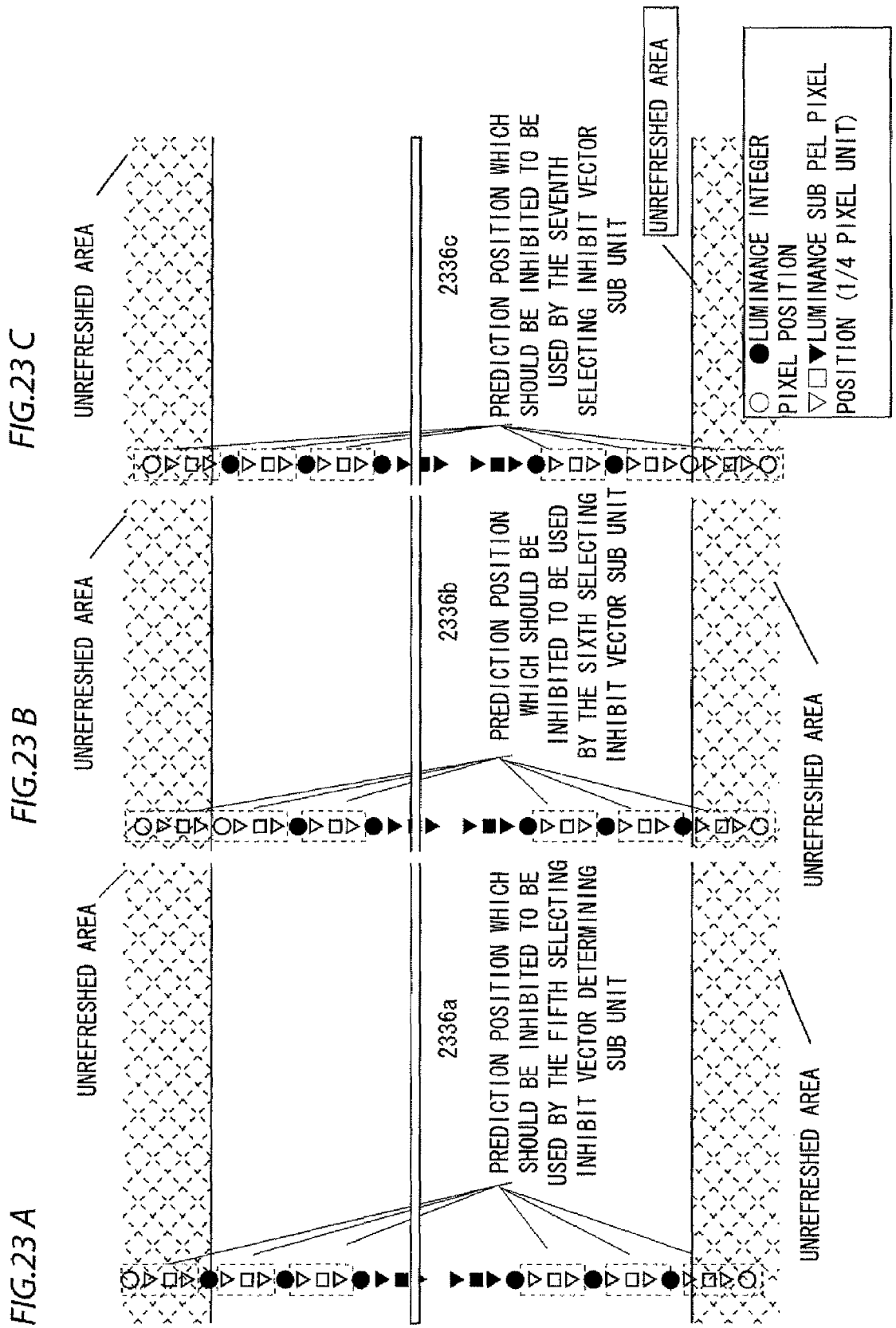

MOVING-PICTURE CODING DEVICE AND MOVING-PICTURE CODING METHOD

CROSS-REFERENCE TO RELATED APPLICATIONS

This application claims the benefit of Japanese Patent Application No. 2007-184011 filed on Jul. 13, 2007, Intellectual Property Office, the disclosure of which is incorporated herein by reference.

BACKGROUND

1. Field

The embodiments discussed herein are directed to a moving-picture coding device and a moving-picture decoding device having an inter-field prediction mode.

2. Description of the Related Art

In general, moving-picture data has a large amount of data. Thus, high efficiency coding is performed upon the moving-picture data is transferred to a receiving device from a transmitting device or is stored in a storage device. In this case, "high efficiency coding" is coding processing of converting a certain data string into another data string and is referred to as a method for compressing the amount of the data. ISO/IEC MPEG-2/MPEG-4 (hereinafter referred to as MPEG-2/MPEG-4) are given as a representative moving-picture coding method. FIG. 1 illustrates an overview of the moving-picture coding device. First, a motion vector determining unit 101 generates a motion vector 105 by using an input image 100 and a reference picture 104 which is a past decoding image. A prediction image generating unit 102 generates a prediction image 103 by using the motion vector 105 and the reference picture 104. A prediction error between the prediction image 103 and the input image 100 is generated in blocks by a subtracting unit 106. Then the prediction error generated in blocks is compressed by an orthogonal transform unit 107 and a quantization unit 108, and is transmitted with the motion vector 105 to an entropy coding unit 109 in which a bit stream is generated. Moreover, an output of the quantization unit 108 expands the prediction error by an inverse quantization unit 110 and an inverse orthogonal transform unit 111. The prediction image 103 and the image which is added and coded by an addition unit 112 are played and stored in a reference image storing unit 113 as the reference picture. A low-delay needs to be achieved in coding and decoding upon a real time communication is made by using such moving-picture coding method. Description is made below of a low-delay coding method of the MPEG-2. The MPEG-2 can define three kinds of pictures, I, P, and B. The I picture is a picture which is able to restore the image only by information inside the picture itself without using a coding image of other picture and the prediction. The P picture is a picture obtained by coding the prediction error generated by the inter-picture prediction performed from a past picture in a forward direction. The B picture is a picture obtained by coding the prediction difference generated by the inter-picture prediction performed in a past picture and a future picture in a bidirectional direction. Since the B picture uses the future picture for the prediction, the future picture used for the prediction needs to be coded prior to the coding. Therefore, the pictures are rearranged in order of the coding. In this case, a method for achieving the low-delay does not use the B picture in order to reduce the delay of rearranging the pictures. A processing unit for the moving-picture coding is a macro block, i.e., the picture is divided into a block of 16×16 pixels.

There are two kinds of macro blocks. One is an intra-macro block in which intra-picture coding is performed, and the other one is an inter-macro block in which inter-picture coding is performed. In this case, the method for achieving the low-delay uses an intra-slice for coding, as the intra-macro block, all the data in a macro block line (slice) in which a macro block is horizontally arranged. Description is made of the intra-slice by using FIG. 2. Each of pictures 210a-210c is coded by the P picture. In this case, the whole picture is circulated with the intra-slice at a certain interval by shifting little by little a position of the macro block line applying the intra-slice from an intra-slice 213a of a $0^{th}$ macro block line to an intra-slice 213b of an $N^{th}$ macro block line, and to intra-slice 213c of an $N+1^{th}$ macro block line. As a result, the refresh of all the pictures (219a, b) is possible after the circulation, and it becomes possible to return from an error occurred due to a transmission error and to decode a video stream in the middle thereof. Moreover, the size of a buffer can be smaller by not using the I picture, so that the delay caused by the buffer can be reduced. In this case, however, upon the macro block belonging to the slice other than the intra-slice of the P picture performs motion compensation by using the vector without limitation, if an error occurs in an unrefreshed area which is not coded by the intra-slice even though the whole picture is circulated with the intra-slice, the error is transmitted in a direction of a space. At worst, the error may remain in a display. Description is made of a problem of a conventional technique by using FIG. 3. An example of FIG. 3 illustrates a case of an unrefreshed area 320 of a reference picture 311 including an encoding error. In this case, in a coding picture 312, upon a motion vector 305 of a coding target block 317 indicates the unrefreshed area 320 including a decoding error of the reference picture 311. Upon a prediction image 316 is generated by using a pixel of this area, the image including the prediction image is used as the reference image following a next picture as illustrated in FIG. 1. Therefore, the decoding error is transmitted to an area 319b which has already been refreshed by the intra-slice. Description is made of this conventional technique by using FIG. 4. In order to solve this problem, a method describes not transmitting the error by providing a motion compensation inhibit line for only a predetermined period for the slice coded by the intra-slice and inhibiting the motion compensation using a nonzero motion vector. In the conventional technique, in a coding picture 412, a coding target block 417 belonging to the area coded as an intra-slice 413a in a reference picture 411 which is the coding picture preceding the coding picture 412 permits only a zero vector (0, 0) in the coding picture 412. As a result, it is guaranteed that a prediction image 416 of the coding target block 417 is comprised of only the pixel comprising the intra-slice of the reference picture 411, and does not use the pixel of an unrefreshed area 420. This makes it possible to reduce the transmission of a coding difference or the like of the unrefreshed area.

When the previous technique is applied to an international standard of moving-picture coding, there is a problem that it is impossible to prevent the transmission of the error in the direction of the space because of an inherent problem of the coding method if the encoding error occurs in the unrefreshed area. Description is made of the problem of a case of applying a conventional technique. As described above, vector limitation is performed with respect to the slice coded by the intra-slice in such a way that only a motion-zero vector is used only in the predetermined period. As a structure of coding the moving-picture comprised of the field.

In the new video coding standard ITU-T H.264(ISO/IEC MPEG-4 Part 10), a calculation method depending on the coding picture and the reference picture is employed in order to generate the motion vector of the chrominance component from the motion vector of the luminance component. A method for deriving the chrominance component in H.264/MPEG-4 AVC can depend on three cases. One is the case upon both a bottom field of the coding picture and the bottom field of the reference picture are the same parity. Another is the case when the coding picture is the top field and the reference picture is the bottom field. The other is the case when the coding picture is the bottom filed and the reference picture is the top field. The following is a equation (1) for generating the chrominance vector from the luminance vector in the case when the coding picture is the bottom field and the reference picture is the top field.

$$MVCy=MVy/2+¼ \quad (1)$$

Further, the following is a equation (2) for generating the chrominance vector from the luminance vector in the case when the coding picture is the top field and the reference picture is the bottom field.

$$MVCy=MVy/2-¼ \quad (2)$$

Still further, the following is a equation (3) for generating the chrominance vector from the luminance vector in the case when the coding picture and the reference picture are the same parity, $$MVCy=MVy/2 \quad (3)$$

In this case, MVCy is a chrominance vector vertical direction component, and MVy is a luminance vector vertical direction component.

In the conventional coding such as the MPEG-2, ½ of the value of the luminance vector, that is, the value corresponding to the equation 3 is used for the chrominance vector in spite of the parity or the like.

Here, at the time of coding the field of a conventional method, when the coding picture is the bottom field and the reference picture is the top field, if the conventional technique such as described in the Patent Document 1 is used to prevent the transmission of the decoding error at the time of coding by the intra-slice, there is a problem that the error may be transmitted in the refresh area in the case upon the decoding error is included in the unrefreshed area. The reason is described as follows. A vector zero (0, 0) can be selected in a frame followed by the intra-slice. In this case, according to the equation 1, since the luminance vector vertical component MVy is 0, the chrominance vector vertical component MVCy is calculated by the following equation (3.5).

$$MVCy=MVy/2+¼=(0/2)+¼=¼ \quad (3.5)$$

That is, the chrominance vector is (0, ¼), a downward vector. As illustrated in FIG. 5, a prediction block area 516 of the luminance component can generate a prediction block by not using the pixel of the unrefreshed area 520 of the luminance. However, as for the chrominance, a prediction block area 518 of the chrominance straddles only ¼ pixel of an unrefreshed area 521. As a result, the prediction image of the chrominance refers to the area including the decoding error, so that the error may be transmitted by the chrominance component.

SUMMARY

According to an embodiment of the present invention, upon the equation for generating the chrominance vector is changed depending on the parity, it is possible to perform refresh of the whole image without causing mismatch even though the decoding error occurs in the unrefreshed area.

It is an aspect of the embodiments discussed herein to provide a moving-picture coding device that performs inter-field motion compensation prediction in response to a moving-picture signal comprised of a plurality of fields. According to an example embodiment the moving-picture coding device includes a coding target picture limit area determining unit that determines a coding target picture limit area putting a limit to a vector used for coding for coding target pictures; a reference limit area determining unit that determines to select, for each reference picture, with respect to one or plurality of reference pictures used for coding, a luminance reference limit area putting a limit to a reference picture used for generating a prediction picture of a luminance of a coding target block belonging to the coding target picture limit area and a chrominance reference limit area putting a limit to the reference picture used for generating the prediction picture of a chrominance of the coding target block belonging to the coding target picture limit area from the coding target picture limit area of the case upon each reference picture is previously coded; a selecting inhibit vector determining unit that determines, in a case of coding the coding block belonging to the coding target picture limit area, a selecting inhibit vector that inhibits selecting by motion determination according to a position of the coding block, a parity of the coding block, and the parity of the reference picture so as to that both prediction images of the luminance and the chrominance are comprised of pixels of the luminance reference limit area and the chrominance reference limit area; and a motion vector determining unit that excludes the selecting inhibit vector to determine a motion vector by the motion determination.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 illustrates an area used for prediction by the luminance and the chrominance when the prediction is performed by a zero vector upon a parity of a coding image is the bottom and the parity of a reference image is the top;

FIG. 8 illustrates an example embodiment of the selecting inhibit vector determining unit;

FIGS. 15A-15B illustrate a prediction position which should be inhibited to be used by the selecting inhibit vector determining sub unit in an example embodiment;

FIGS. 16A-16B illustrate a positional relation of the reference limit area, the coding target picture limit area, and the coding block;

FIGS. 21A-21B illustrate the position of the prediction which should be inhibited to be used by the selecting inhibit vector determining sub unit in an example embodiment;

FIGS. 23A-23C illustrate the position of the prediction which should be inhibited to be used by the selecting inhibit vector determining sub unit in an example embodiment.

DETAILED DESCRIPTION OF THE EMBODIMENTS

Figure 1:
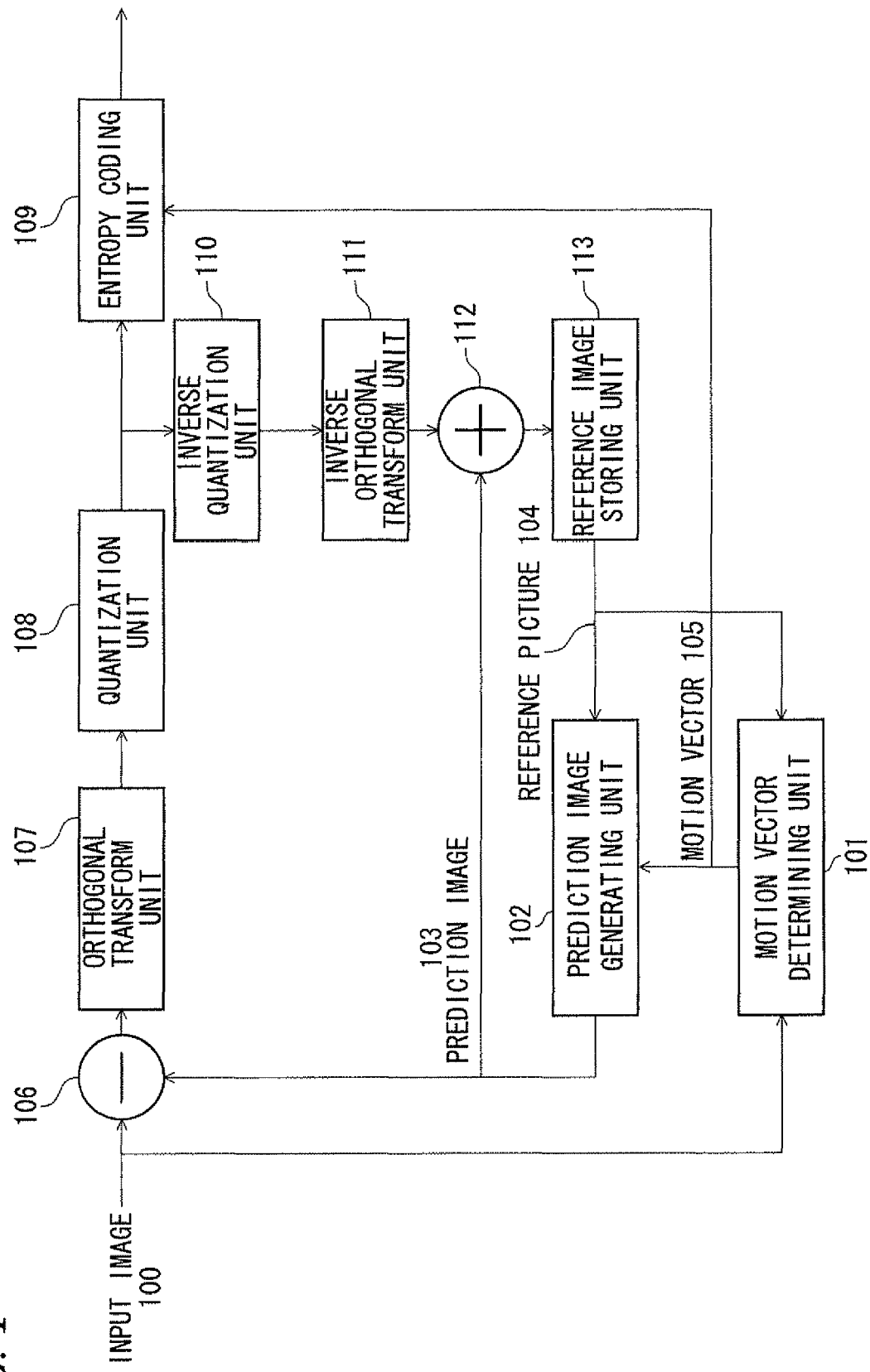
FIG. 1 illustrates a moving-picture coding device.
Figure 2:
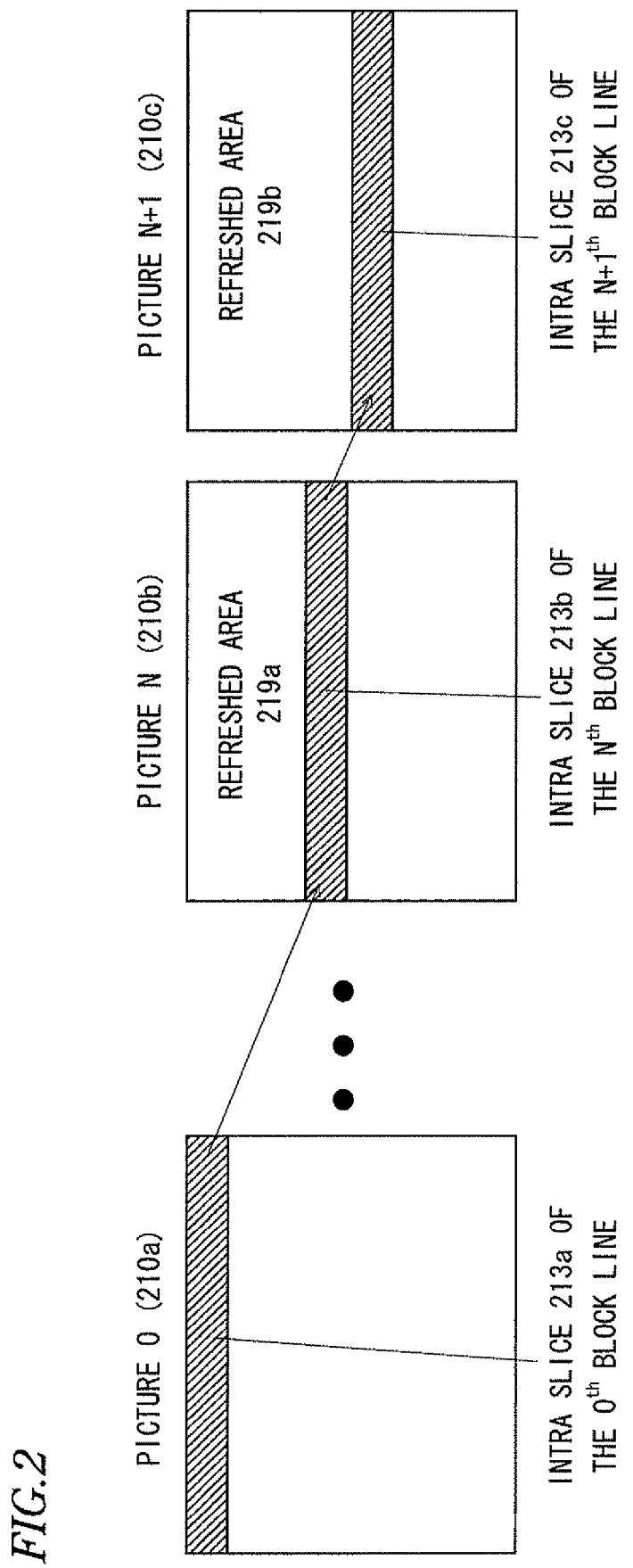
FIG. 2 illustrates an intra-slice.
Figure 3:
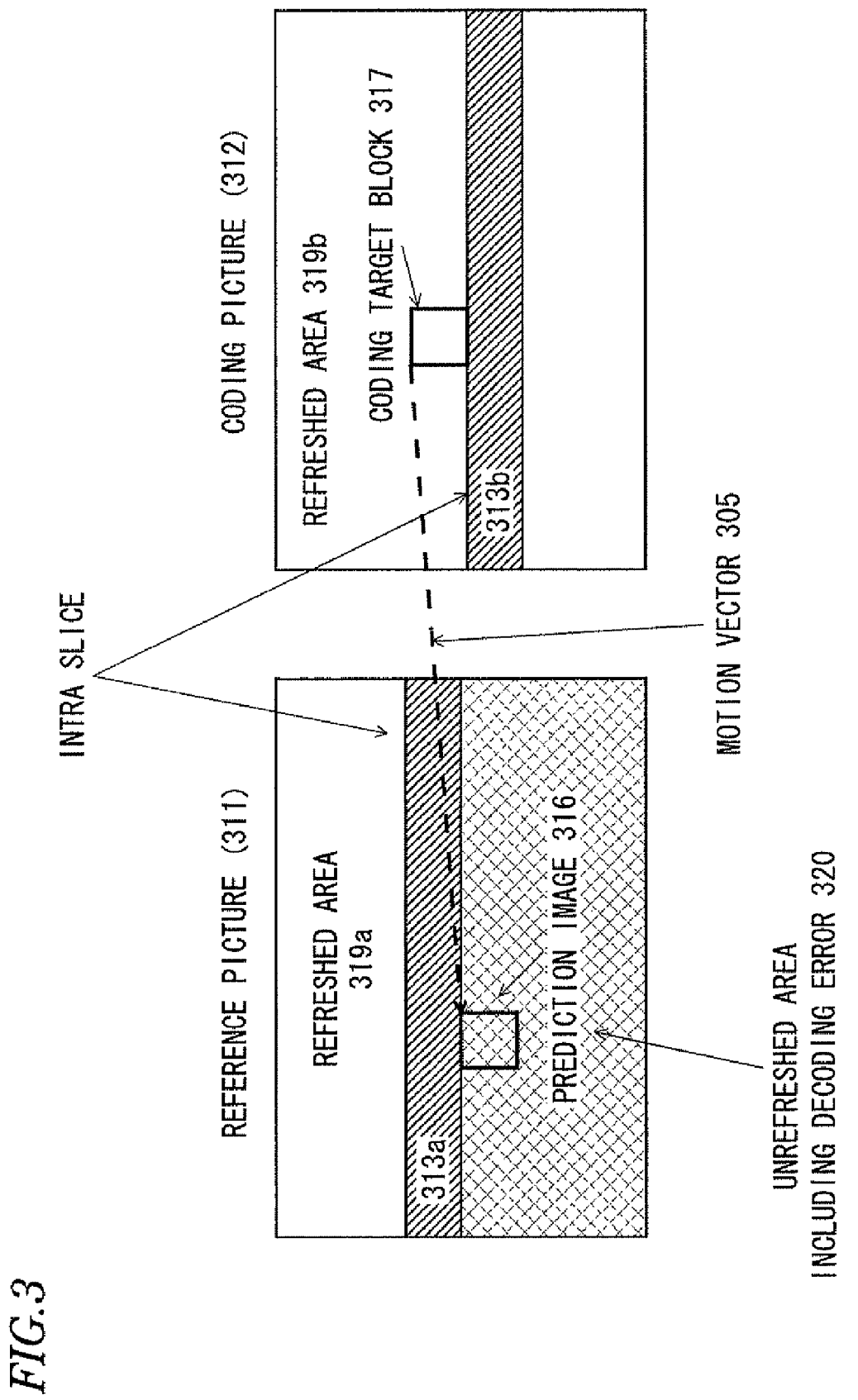
FIG. 3 illustrates a vector limit for the intra-slice.
Figure 4:
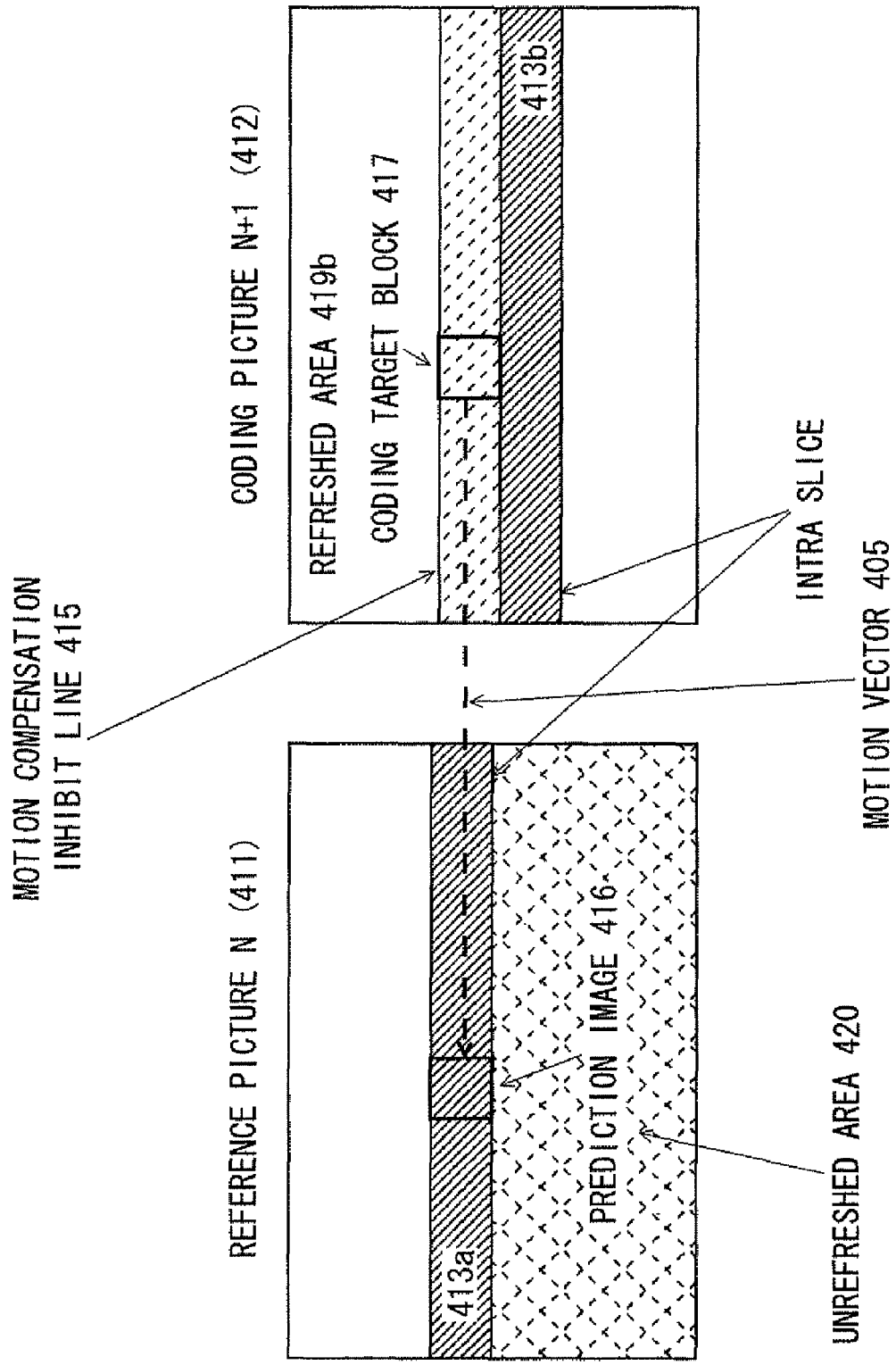
FIG. 4 illustrates a vector limit method.
Figure 6:
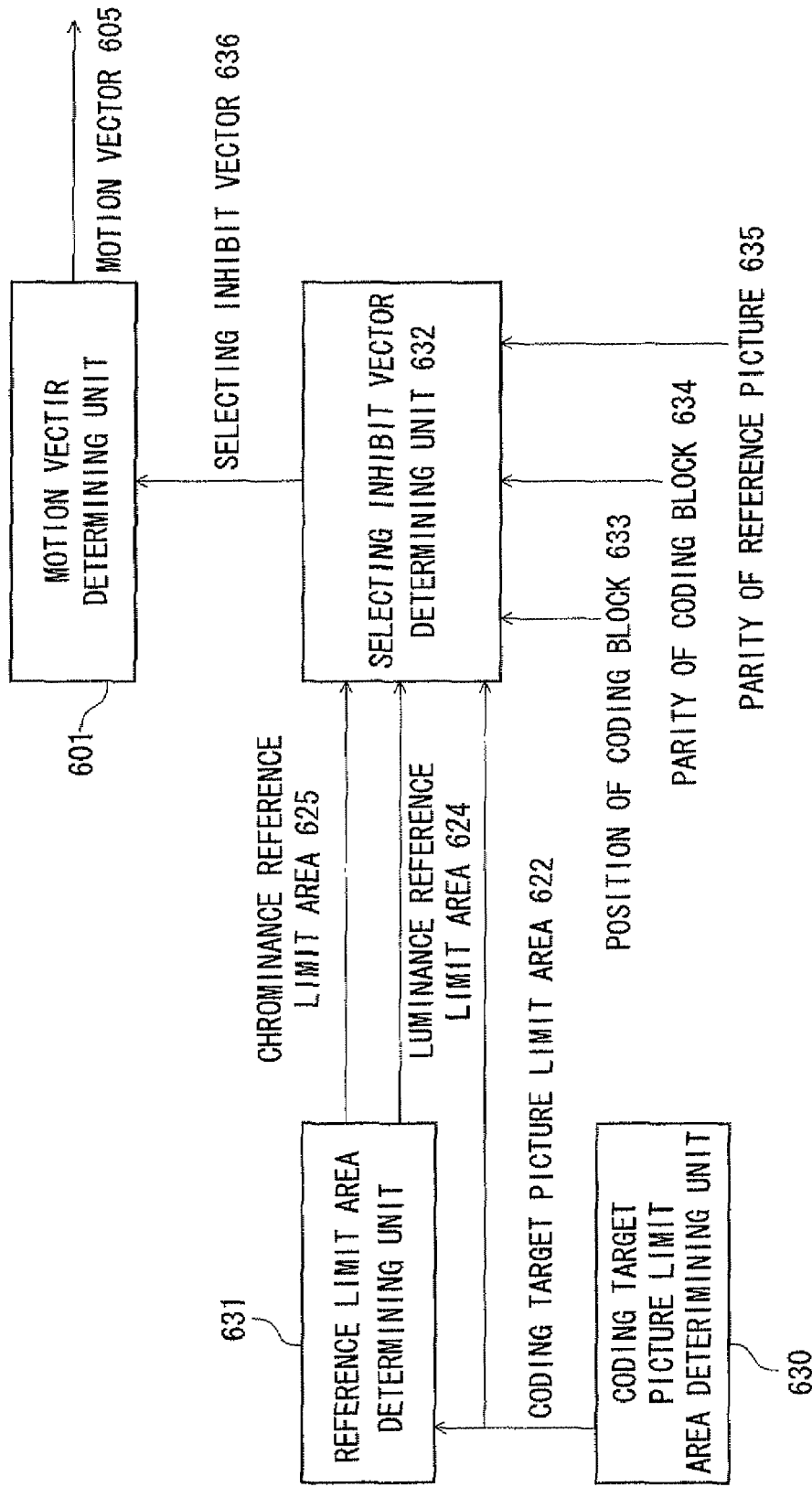
FIG. 6 illustrates an example embodiment.
Figure 7:
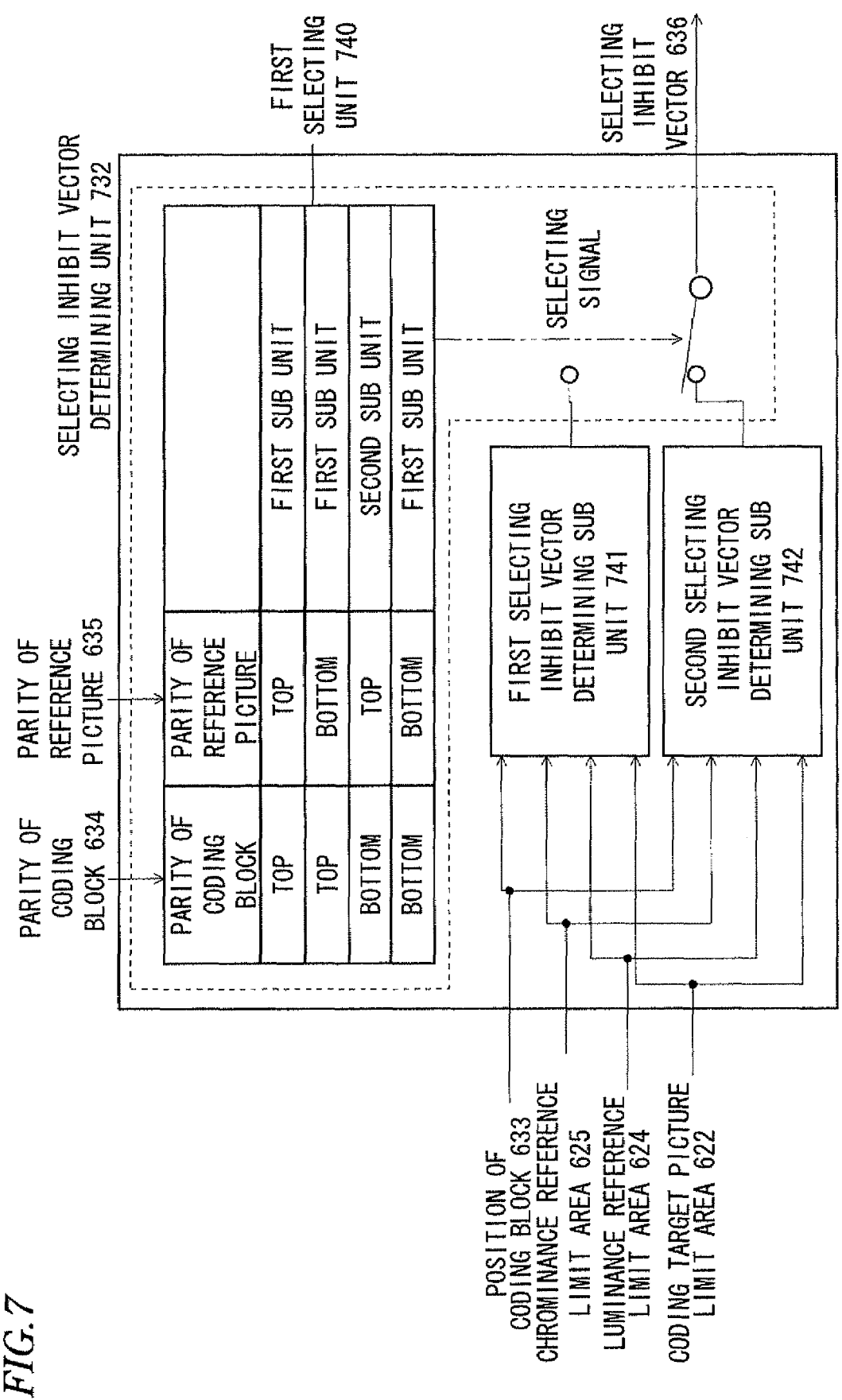
FIG. 7 illustrates an example embodiment of a selecting inhibit vector determining unit.

Reference will now be made in detail to the embodiments, examples of which are illustrated in the accompanying drawings, wherein like reference numerals refer to the like elements throughout. The embodiments are described below to explain the present invention by referring to the figures.

Figure 10:
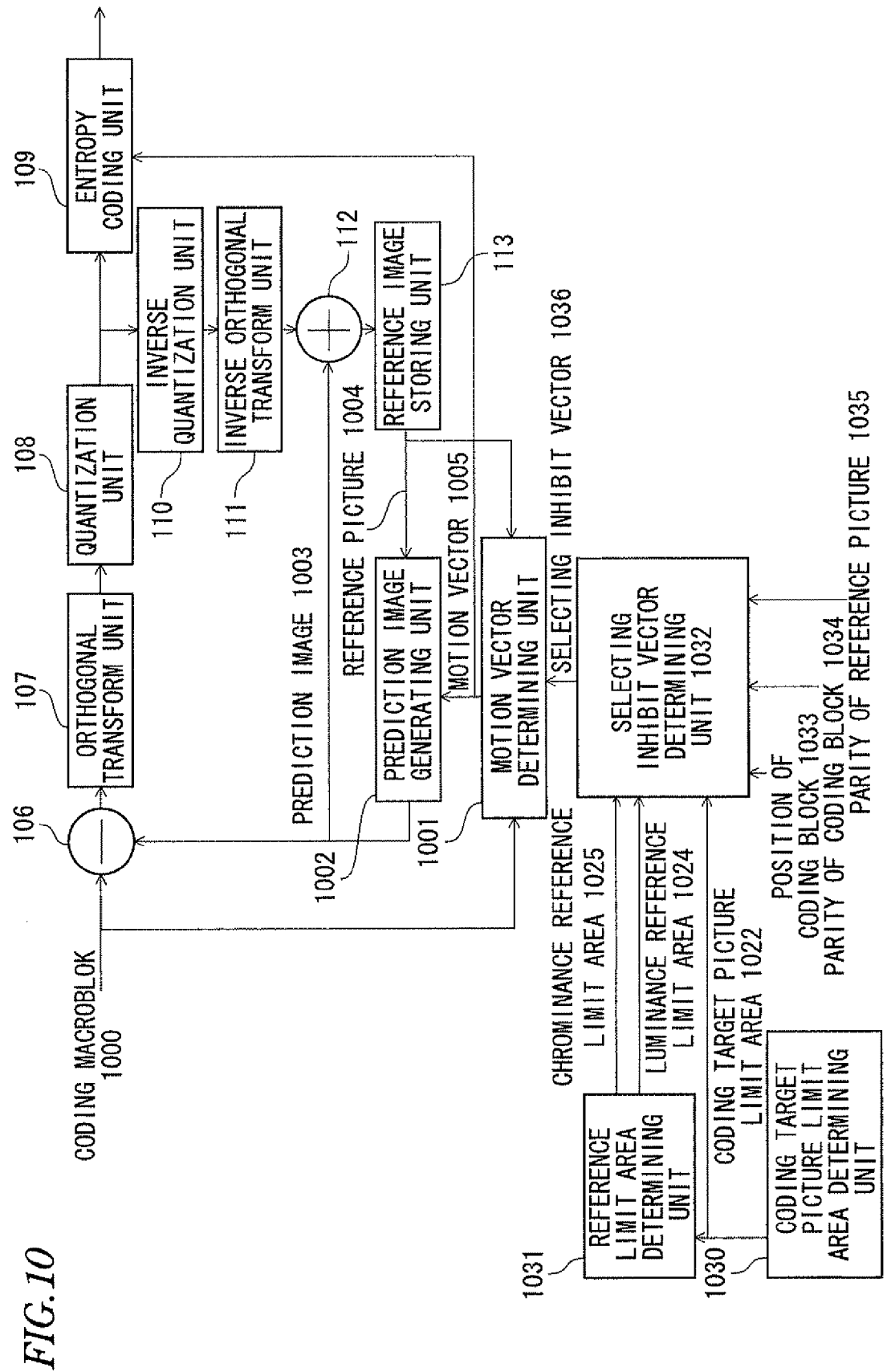
FIG. 10 illustrates an example embodiment.

FIG. 10 illustrates an example embodiment. Each unit comprising a similar function as that of FIG. 1 is indicated with the same numeral number as that of FIG. 1, and the description is omitted. First, a coding target picture limit area determining unit 1030 sets a coding target picture limit area 1022 which puts a limit to the vector used for coding in the coding image.

Furthermore, for one or a plurality of the reference pictures, a reference limit area determining unit 1031 determines to select part of the coding target picture limit area to determine whether or not a chrominance reference limit area 1024 which puts the limit to the reference picture used by each coding block belonging to a coding target picture limit area 1022 of a current coding target to generate a prediction image of luminance and a chrominance reference limit area 1025 which puts the limit to the reference image used by the block of the coding target picture limit area to generate the prediction image of chrominance are identical to the coding target picture limit area which was set upon each reference picture was coded in the past.

Figure 11:
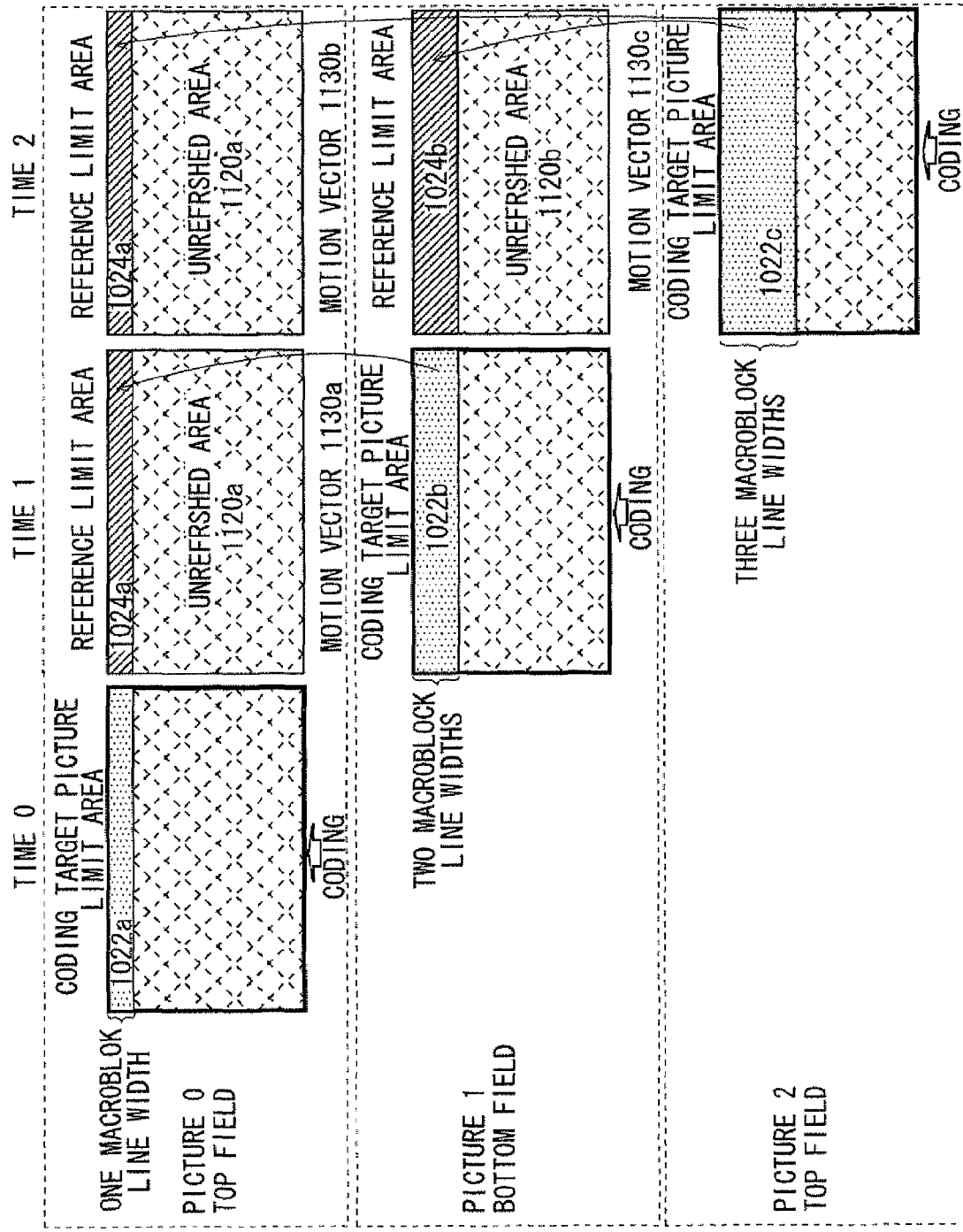
FIG. 11 illustrates a coding target picture limit area and a reference limit area and a reference limit area.

FIG. 11 illustrates an example of how the coding target picture limit area determining unit 1030 and the reference limit area determining unit 1031 sets the area. Since the coding target picture limit area and the reference limit area operate on the luminance and the chrominance in the exact same way, the luminance and the chrominance are not distinguished in FIG. 11.

The example of FIG. 11 illustrates that a picture 0 of the top field is coded at Time 0, a picture 1 of the bottom field is coded at Time 1, and a picture 2 of the top filed is coded at Time 2. Further, the picture 0 is used as the reference image of the picture 1 to be coded at Time 1, and the picture 0 and the picture 1 are used as the reference image of the picture 2 to be coded at Time 2.

First, description is made of an operation of the coding target picture limit area determining unit 1030. As described later, in the macro block belonging to the coding target picture limit area, the pixel of the unrefreshed area is not referred in the past reference picture. Furthermore, the unrefreshed area is controlled to be reduced as the coding of the picture proceeds. As a result, this coding target picture limit area is expanded as the coding of the picture proceeds.

Where FIG. 11, the coding target picture limit area determining unit 1030 controls in such a way that the coding target picture limit area is expanded sequentially downwards, so that a coding target picture limit area 1022a is as wide as one of a macro block line width in the picture 0, a coding target picture limit area 1022b is as wide as two of the macro block line width in the picture 1, and a coding target picture limit area 1022c is as wide as three of the macro block line width. Then, upon the coding target picture limit area finishes covering the whole image, there is no unrefreshed area left on the picture, which can make a complete return from the decoding error and the like.

Next, description is made of an operation of the reference limit area determining unit 1031. The reference limit area determining unit selects part of the coding target picture limit area in order to determine whether or not each reference picture is identical to the coding target picture limit area which was set at the time of coding in the past.

Where FIG. 11, the reference limit area determining unit sets the coding target picture limit area 1022a which is set to the picture 0 in Time 0 as a reference limit area 1024a in Time 1 and Time 2, respectively. Further, in Time 1, the reference limit area determining unit sets the coding target picture limit area 1022b as a reference limit area 1024b in Time 2.

According to an example embodiment, the coding target picture limit area 1022b in the picture 1 of Time 1 and the coding target picture limit area 1022b in the picture 1 of Time 2 are deemed to be identical. However, the reference limit area 1024b can be part of the coding target picture limit area 1022b.

A selecting inhibit vector determining unit 1032 controls a motion vector 1130a in such a way that the prediction images of both the luminance and the chrominance generated by the motion vector 1130a, which is defined upon the coding picture is the picture 1 and the reference picture is the picture 0, are comprised of only the pixel of the reference limit area 1024a.

The selecting inhibit vector determining unit 1032 controls a motion vector 1130b in such a way that the prediction images of both the luminance and the chrominance generated by the motion vector 1130b, which is defined upon the coding picture is the picture 2 and the reference picture is the picture 0, are comprised of only the pixel of the reference limit area 1024a.

Similarly, the selecting inhibit vector determining unit 1032 controls a motion vector 1130c in such a way that the prediction images of both the luminance and the chrominance generated by the motion vector 1130c, which is defined upon the coding picture is the picture 2 and the reference picture is the picture 1, are comprised of only the pixel of the reference limit area 1024b.

As described above, by controlling the selecting inhibit vector determining unit 1032, the macro block belonging to the coding target picture limit area performs prediction only by the pixel belonging to the area in which the reference of the unrefreshed area was never used in the past. This makes it possible to achieve the return from the error image even though the decoding error or the like occurs in the unrefreshed area.

A sequentially-expanded area corresponding to a difference area of the coding target picture limit area of sequential two pictures can be coded by the intra-slice. However, in the case upon the video is moving from the top to the bottom, the image giving a good prediction may exist in the reference limit area of the reference picture. Therefore, inter-frame prediction coding can be performed by the vector on the sequentially-expanded area, and the coding does not have to be performed by the intra-slice.

Next, description is made of the case upon the chrominance vector refers to the pixel of the unrefreshed area upon the coding image is the bottom and the reference image is the top even though the vector of the luminance component indicates the prediction position of the reference limit area.

Upon the coding image is the bottom and the reference image is the top, as illustrated in the equation 1, the vector of the chrominance is a value shifted forward only by ¼ compared to the vector derived by the conventional MPEG-2 or the like. A prediction of the luminance can be performed by ¼ pixel precision, and the prediction of the chrominance is performed by ⅛ pixel precision of the color component.

Figure 12A:
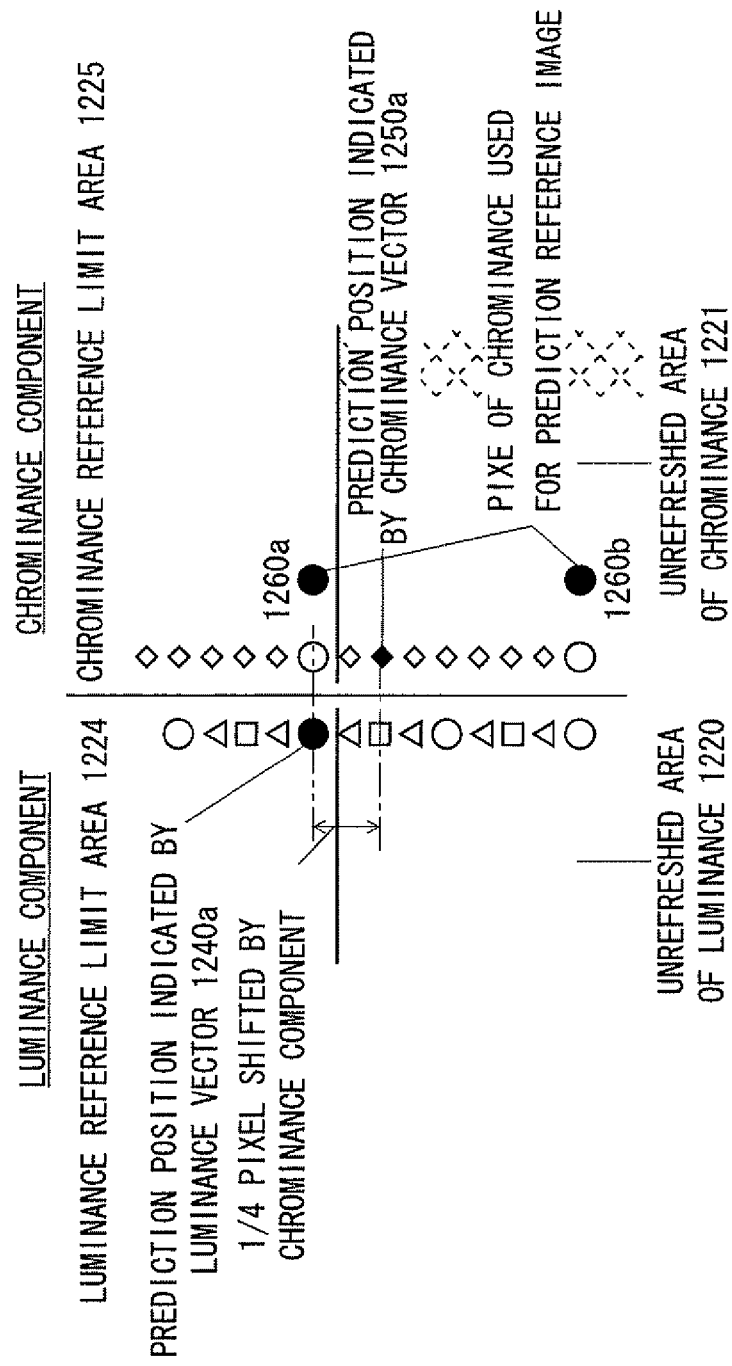
FIGS. 12A-12B illustrate a case when a chrominance vector uses a pixel of an unrefreshed area if the coding image is the bottom and the reference image is the top.

FIG. 12A illustrates the position of the prediction which should be indicated by the chrominance vector upon the coding image is the bottom and the reference image is the top, and upon the luminance vector refers to an integer pixel position 1240*a* belonging to a luminance reference limit area 1224 as a position of the prediction at a boundary with a luminance unrefreshed area 1220. This corresponds to the case, for example, upon the motion vector 1130*a* of FIG. 11 indicates the picture 0 in the top field from the picture 1 in the bottom field. In this case, a position 1250*a* indicated by the chrominance vector indicates the position shifted by ¼ pixel of the chrominance component from the position 1240*a* of the luminance. In a conventional method, in order to form a prediction value of the chrominance of this position 1250*a*, a chrominance pixel 1260*b* belonging to a chrominance unrefreshed area 1221 is necessary as well as a chrominance pixel 1260*a* belonging to a chrominance reference limit area 1225.

Here, if the value of the prediction pixel 1250*a* to be obtained is X, the pixel value of the pixel 1260*a* to be obtained is A, and the pixel value of the pixel 1260*b* to be obtained is B, the 1250*a* is a dividing point in 1:3 of the 1260*a* and the 1260*b*. A value X can be calculated by a equation 4.

$$X=(6 \cdot A+2 \cdot B+4)>>3 \qquad (4)$$

Figure 12B:
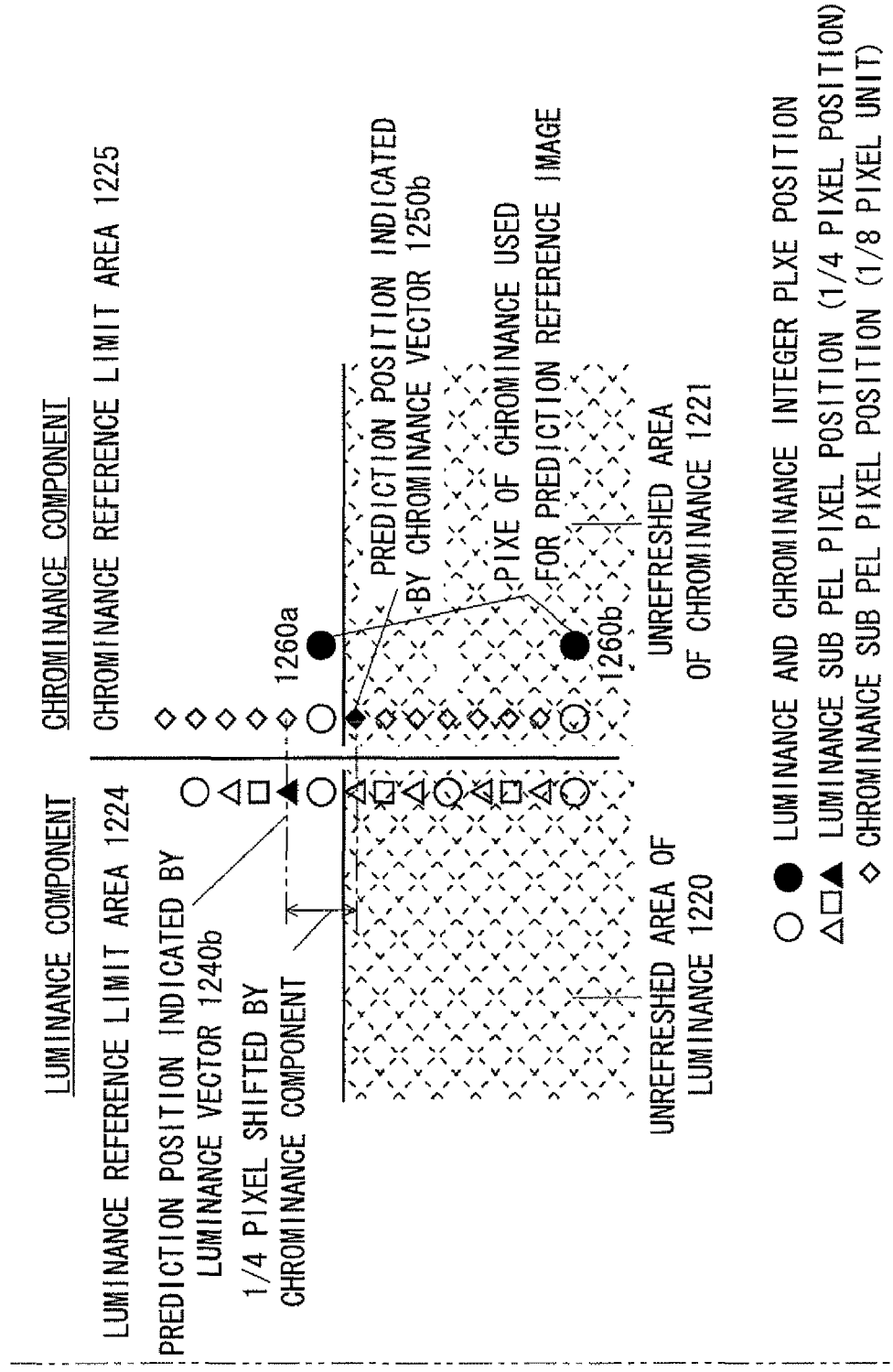

">>3" in the equation indicates that the value is shifted by three bits to the right, which is equivalent to dividing the value by eight (handling of the value is different from that of the division where a negative value). FIG. 12B illustrates the position of the prediction which should be indicated by the chrominance vector upon the coding image is the bottom and the reference image is the top if the luminance vector refers the position of the predication by the luminance pixel precision to the above described position 1240*a* as a position 1240*b* of the prediction. As well as in this case, the position 1250*b* indicated by the chrominance vector is a position shifted by ¼ pixel of the chrominance component from the position 1240*b* of the luminance as illustrated in FIG. 12B. In this case, a value Y of the prediction pixel 1250*b* can be calculated by a equation 5.

$$Y=(7 \cdot A+B+4)>>3 \qquad (5)$$

That is, upon the coding image is the bottom and the reference image is the top, and if the vector referring to the position 1240*a* and the position 1240*b* exist, there is a need to refer to the pixel belonging to the unrefreshed area of the chrominance to generate the prediction image of the chrominance. In this case, the selecting inhibit vector determining unit needs to be operated to inhibit a vector which may refer to the 1240*a* and the 1240*b*.

Figure 13A:
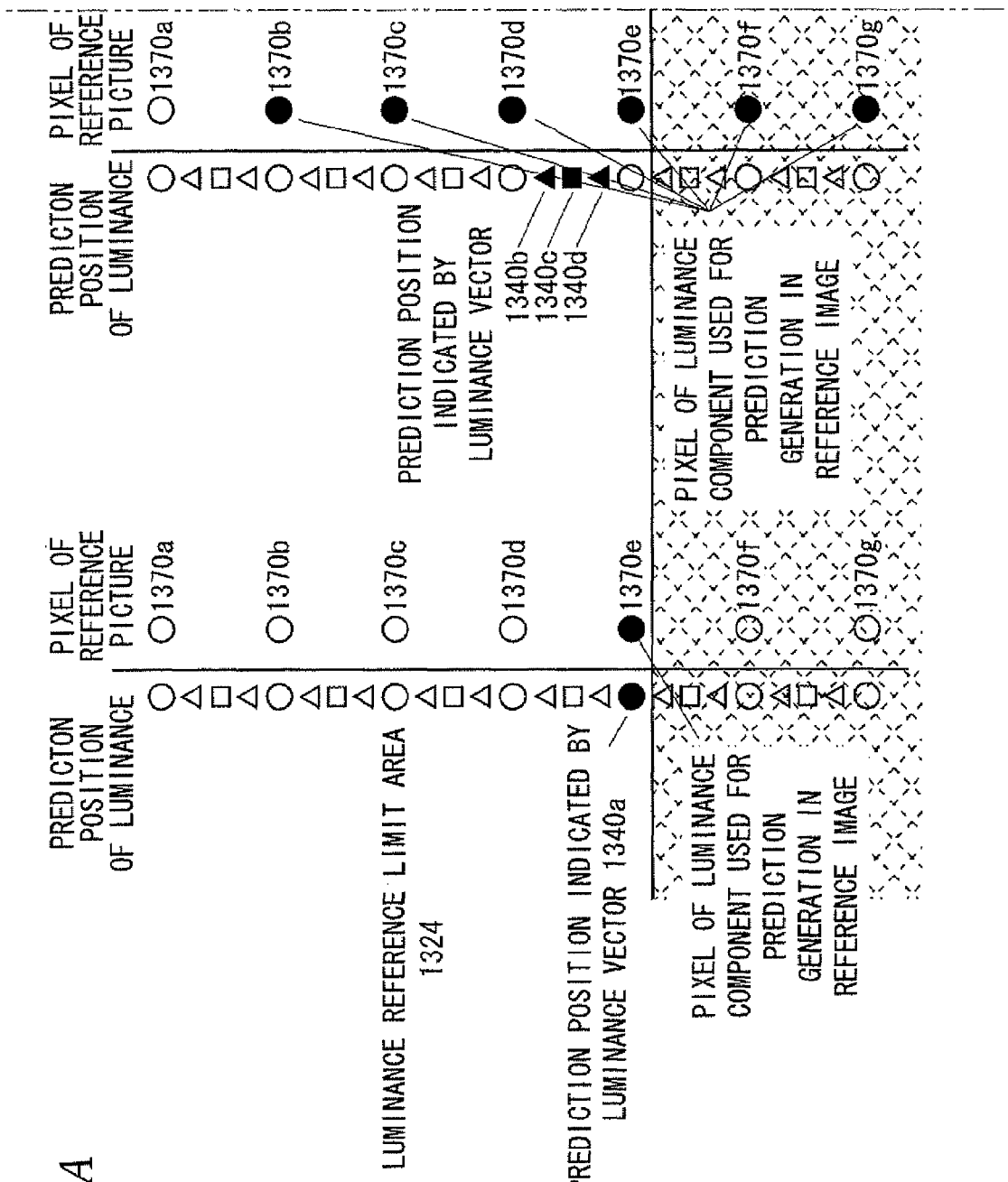
FIG. 13 illustrates a case when a luminance vector uses the pixel of the unrefreshed area.
Figure 13B:
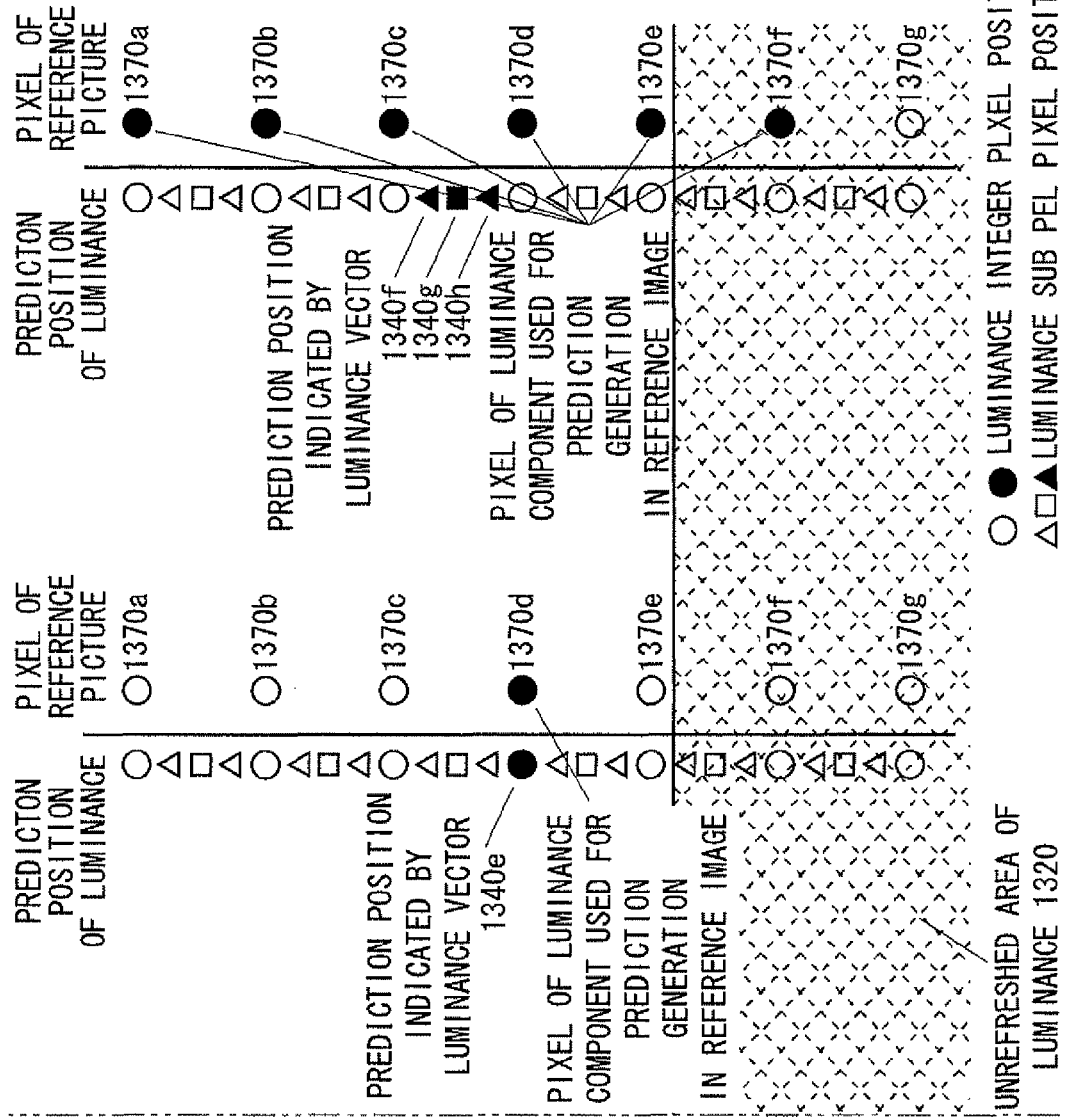

Next, by using FIG. 13, description is made of the case upon the pixel of the unrefreshed area of the luminance is referred in order to generate the prediction value of the luminance even though the vector of the luminance component indicates the prediction position of the inside of the luminance reference limit area.

First, if the prediction position indicated by the luminance vector is an integer pixel position, i.e., 1340*a* and 1340*e*, only the pixel position of corresponding reference picture is used to generate the prediction. Therefore, if the prediction position is the 1340*a* and the 1340*e*, only a pixel 1370*e* and a pixel 1370*d* of only a luminance reference area 1324 are used as the prediction value, respectively. This makes it possible to select the vector which indicates both the prediction positions.

Meanwhile, if the prediction position indicated by the luminance vector is 1340*b*, 1340*c*, and 1340*d*, the pixels 1370*b*, 1370*c*, 1370*d*, 1370*e*, 1370*f*, and 1370*g* are necessary to generate the prediction value of the pixel corresponding to these prediction positions. For example, in the case upon the prediction value of the pixel of the prediction position of the 1340*c* is Z, and the value of each of the pixels 1370*b*, 1370*c*, 1370*d*, 1370*e*, 1370*f*, and 1370*g* is RefB, RefC, RefD, RefE, RefF, and RefG, respectively, a value Z can be calculated by the following equation (6).

$$Z=(\text{Ref}B-5\cdot\text{Ref}C+20\cdot\text{Ref}D+20\cdot\text{Ref}E-5\cdot\text{Ref}F+\text{Ref}G+16)>>5 \qquad (6)$$

In this case, a pixel 1370*f* and a pixel 1370*g* belong to an unrefreshed area 1340 of the luminance. Thus, in order to refer to prediction positions 1340*b*, 1340*c*, and 1340*d* by the vector, it is necessary to use the pixel of the unrefreshed area of the luminance for generating the prediction value. Therefore, the selecting inhibit vector determining unit is operated to inhibit the vector which may refer the 1340*b*, the 1340*c*, and the 1340*d*. Similarly, upon the prediction positions indicated by the luminance vector are 1340*f*, 1340*g*, and 1340*h*, it is necessary to use the pixel of the 1370*a*, the 1370*b*, the 1370*c*, the 1370*d*, the 1370*e*, and the 1370*f*. In this case, the 1370*f* belongs to the unrefreshed area. Therefore, the selecting inhibit vector determining unit needs to be operated to inhibit the vector which may refer to the 1340*b*, the 1340*c*, and the 1340*d*. Next, description is made of the selecting inhibit vector determining unit 1032 by using the matter that the pixel position which should be inhibited to be used in the chrominance and the luminance as described in FIGS. 12A-12B and FIG. 13.

Figure 14:
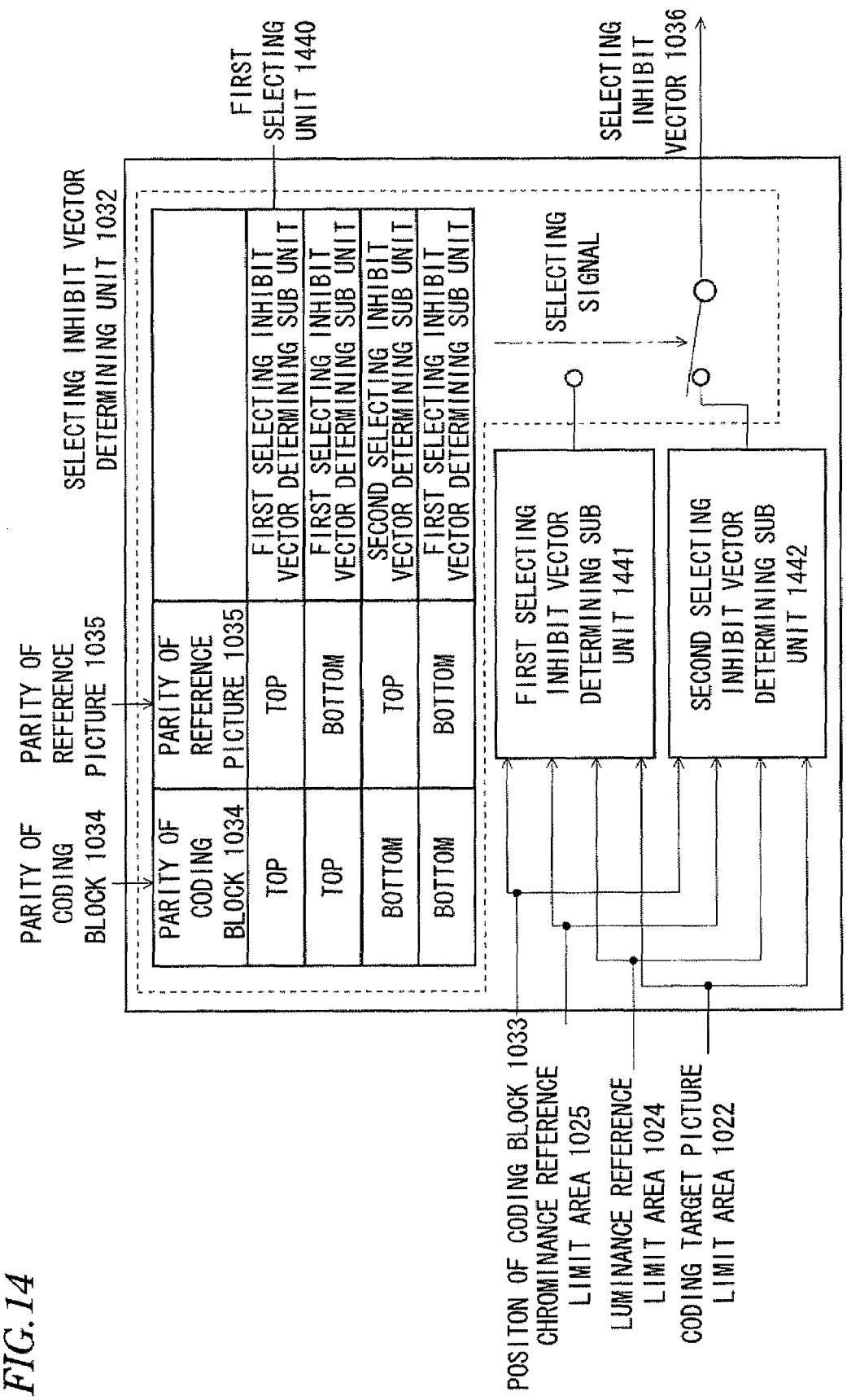
FIG. 14 illustrates an example embodiment of a selecting inhibit vector determining sub unit.

FIG. 14 illustrates an example embodiment of the selecting inhibit vector determining unit. This selecting inhibit vector determining unit includes an example selecting unit 1440 which has a coding block parity 1034 and a reference picture parity 1035 as input and selects a selecting inhibit vector 1036 by selecting an example selecting inhibit vector determining unit 1441 or an example selecting inhibit vector determining unit 1442.

According to a table of FIG. 14, an example selecting unit operates to select an example selecting inhibit vector determining sub unit upon the coding block parity 1034 and the reference picture parity 1035 are identical if the coding block parity 1034 is the top and the reference picture parity 1035 is the bottom, and to select an example selecting inhibit vector determining sub unit upon the reference picture parity 1035 is the top.

Next, description is made of how an example and second selecting inhibit vector determining sub units derive the selecting inhibit vector from the unrefreshed area of the luminance and the chrominance.

In order to derive the selecting inhibit vector, first, description is made of the prediction position which should be inhibited to be used. FIGS. 15A-15B illustrate the prediction position which should be inhibited to be used by an example and second selecting inhibit vector determining sub units.

First, an example selecting inhibit vector determining sub unit obtains the selecting inhibit vector upon the coding block parity 1034 and the reference picture parity 1035 are identical if the coding block parity 1034 is the top and the reference picture parity 1035 is the bottom. Where a condition of this parity, the pixel of the chrominance unrefreshed area is never referred to generate the chrominance prediction upon the reference position indicates the luminance reference limit area 1324 of FIG. 13. Therefore, where the present condition, a prediction position 1536a which should be inhibited to be used by an example selecting inhibit vector determining unit belongs to a luminance unrefreshed area 1320 as illustrated in FIGS. 15A-15B and is integrated by the 1340b, the 1340c, the 1340d, the 1340f, the 1340g, and the 1340h.

Next, an example selecting inhibit vector determining sub unit obtains the selecting inhibit vector upon the coding block parity 1034 is the bottom and the reference picture parity 1035 is the top. Where this parity condition, as illustrated in FIGS. 12A-12B, the pixel of the chrominance unrefreshed area may be used to generate the prediction of the chrominance upon the reference position is the 1240a and the 1240b, so that these references should be inhibited. Therefore, in this condition, a prediction position 1536b which should be inhibited to be used should belong to the luminance unrefreshed area 1320 and is integrated by the 1240a and the 1240b shown in FIGS. 12A-12B, and the 1340b, the 1340c, the 1340d, the 1340f, the 1340g, and the 1340h shown in FIG. 13. In this case, a pixel position 1550 indicates a pixel position which can be used or not used depending on an example and second selecting inhibit vector determining sub units.

Next, description is made of how an example and second selecting inhibit vector determining sub units derive the selecting inhibit vector based on the prediction position which should be inhibited to be used, the coding target picture limit area, and the position of the coding block described in FIGS. 15A-15B.

FIG. 16A illustrates the case of referring a picture 1 which is the bottom filed at the time of coding a picture 2 which is the top field. In this case, the reference limit area is as wide as two of the micro block line width from the top of the picture, and the coding target picture limit area is as wide as three of the macro block line width from the top of the picture. Judging from the parity condition, an example selecting unit selects an example selecting inhibit vector determining sub unit. In this case, description is made of how an example selecting inhibit vector determining sub unit derives the selecting inhibit vector by using FIGS. 16A-16B and FIG. 17.

Figure 17A:
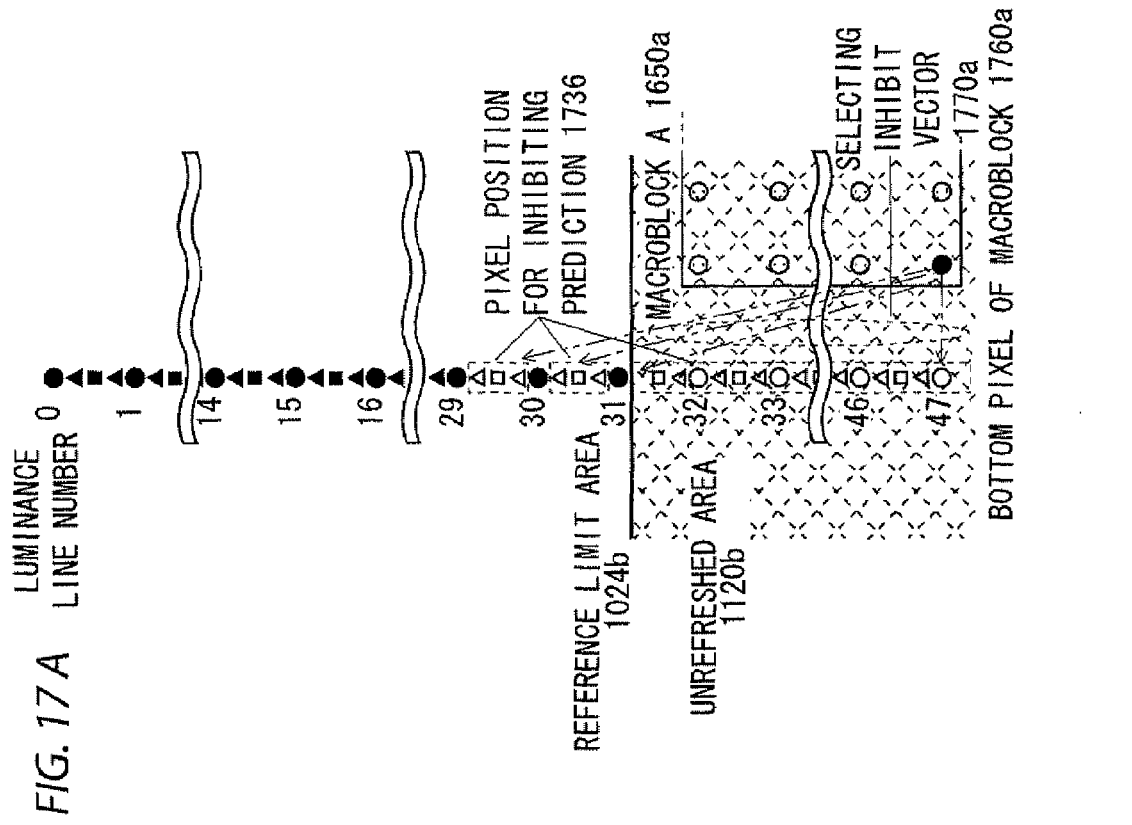
FIGS. 17A-17C illustrate an operation of an example selecting inhibit vector determining sub unit.
Figure 17B:
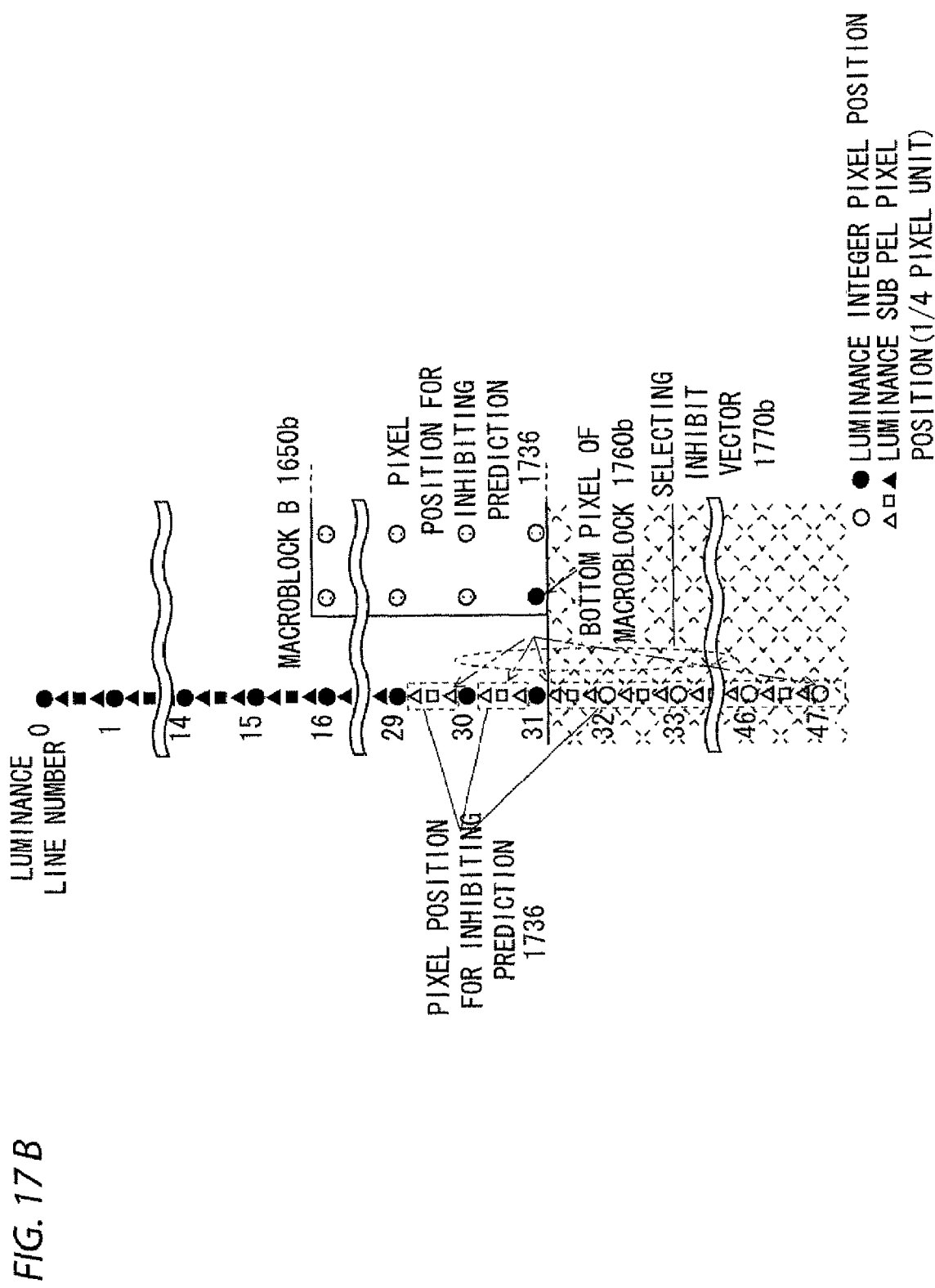
Figure 17C:
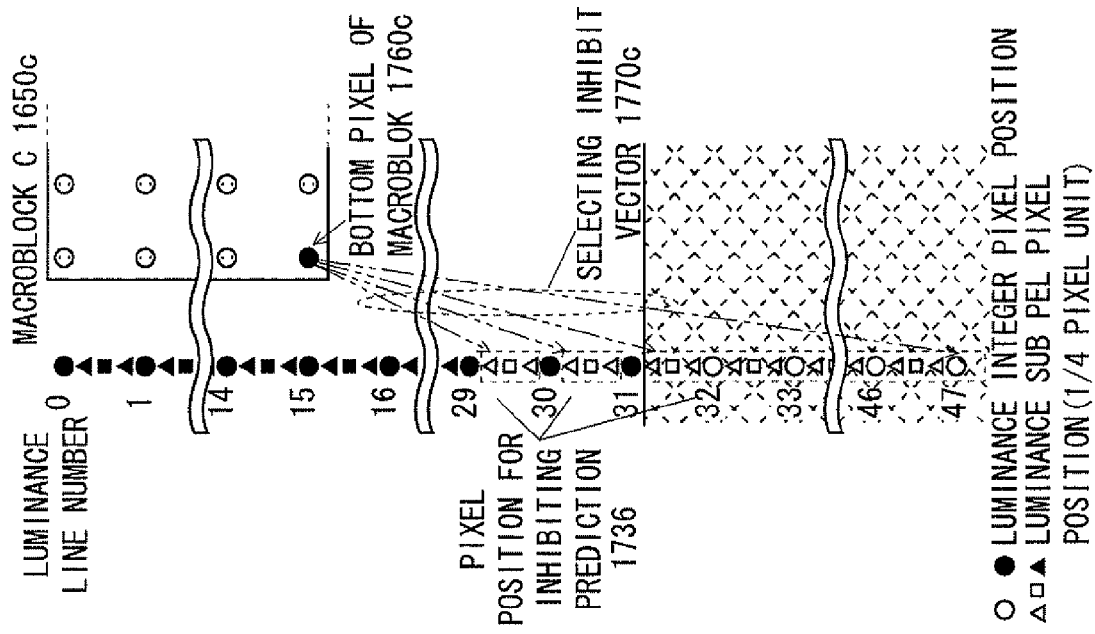

FIGS. 17A-17C illustrate how an example selecting inhibit vector determining sub unit obtains the selecting inhibit vector based on the macro blocks A (1650a), B (1650b), and C (1650c) and a relation of an unrefreshed area 1120b and the reference limit area 1024b where FIG. 16A. Luminance line numbers in FIGS. 17A-C are a coordinate in a vertical direction, numbering in ascending order as the pixel line increases with 0 for the pixel line at the top of the picture.

FIG. 17A is a diagram for obtaining the selecting inhibit vector for the macro block A. A selecting inhibit vector 1770a inhibits all the vectors having a vertical direction difference between a position 1736b of the pixel inhibiting the prediction and a bottom pixel 1760a of the macro block A (1650a). Where this example, a y coordinate of the bottom pixel 1760a of the macro block is 47, and the position of the pixel inhibiting the prediction is more than 29.25 and less than 29.75, more than 30.25 and less than 30.75, and more than 31.25. Therefore, an example selecting inhibit vector determining sub unit derives the vector, as the vector which should be inhibited, whose y component is the difference between the two pixels, that is, more than −17.75 and less than −17.25, more than −16.75 and less than −16.25, and more than −15.75.

Similarly, as for the macro block B, a selecting inhibit vector 1770b inhibits all the vectors having the vertical direction difference between the position 1736 of the pixel inhibiting the prediction and a bottom pixel 1760b of the macro block B (1650b). Where this example, the y coordinate of the bottom pixel 1760b of the macro block is 31. Similarly, the position of the pixel inhibiting the prediction is more than 29.25 and less than 39.75, more than 30.25 and less than 30.75, and more than 31.25. Accordingly, an example selecting inhibit vector determining sub unit derives the vector, as the vector which should be inhibited, whose y component is the difference between the two pixels, that is, more than −1.75 and less than −1.25, more than −0.75 and less than −0.25, and more than 0.25.

Similarly, as for the macro block C, a selecting inhibit vector 1770c inhibits all the vectors having the vertical direction difference between the position 1736 of the pixel inhibiting the prediction and a bottom pixel 1760c of the macro block C (1650c). Where this example, the y coordinate of the bottom pixel 1760c of the macro block is 15, and the position of the pixel inhibiting the prediction is more than 29.25 and less than 29.75, more than 30.25 and less than 30.75, and more than 31.25. Accordingly, an example selecting inhibit vector determining sub unit derives the vector, as the vector which should be inhibited, whose y component is the difference between the two pixels, that is, more than 14.25 and less than 14.75, more than 15.25 and less than 15.75, and more than 16.25.

Moreover, there is no need to put a vector limit to a macro block D of FIG. 16A, unlike where the macro blocks A to C, because the macro block D does not belong to the coding target picture limit area 1022c.

FIG. 16B illustrates the case of referring the picture 0 which is the top field at the time of coding the coding picture 1 which is the bottom field in FIG. 11. This case illustrates that the reference limit area 1024a is as wide as one of the macro block line width, and the coding target picture limit area 1022b is as wide as two of the macro block line width. Judging from the parity condition, an example selecting unit selects an example selecting inhibit vector determining sub unit. In this case, description is made of how an example selecting inhibit vector determining sub unit derives the selecting inhibit vector by using FIG. 16 and FIGS. 18A-18B.

Figure 18A:
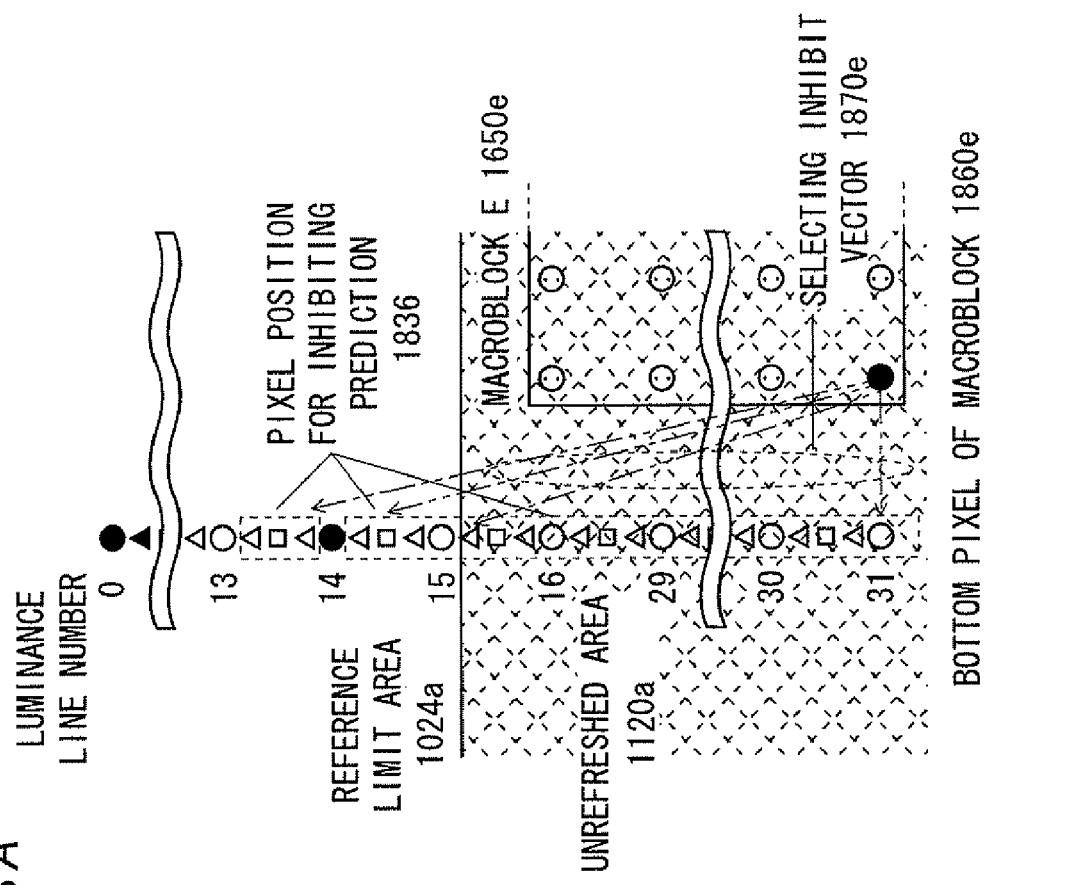
FIGS. 18A-18B illustrate an operation of an example selecting inhibit vector determining sub unit.
Figure 18B:
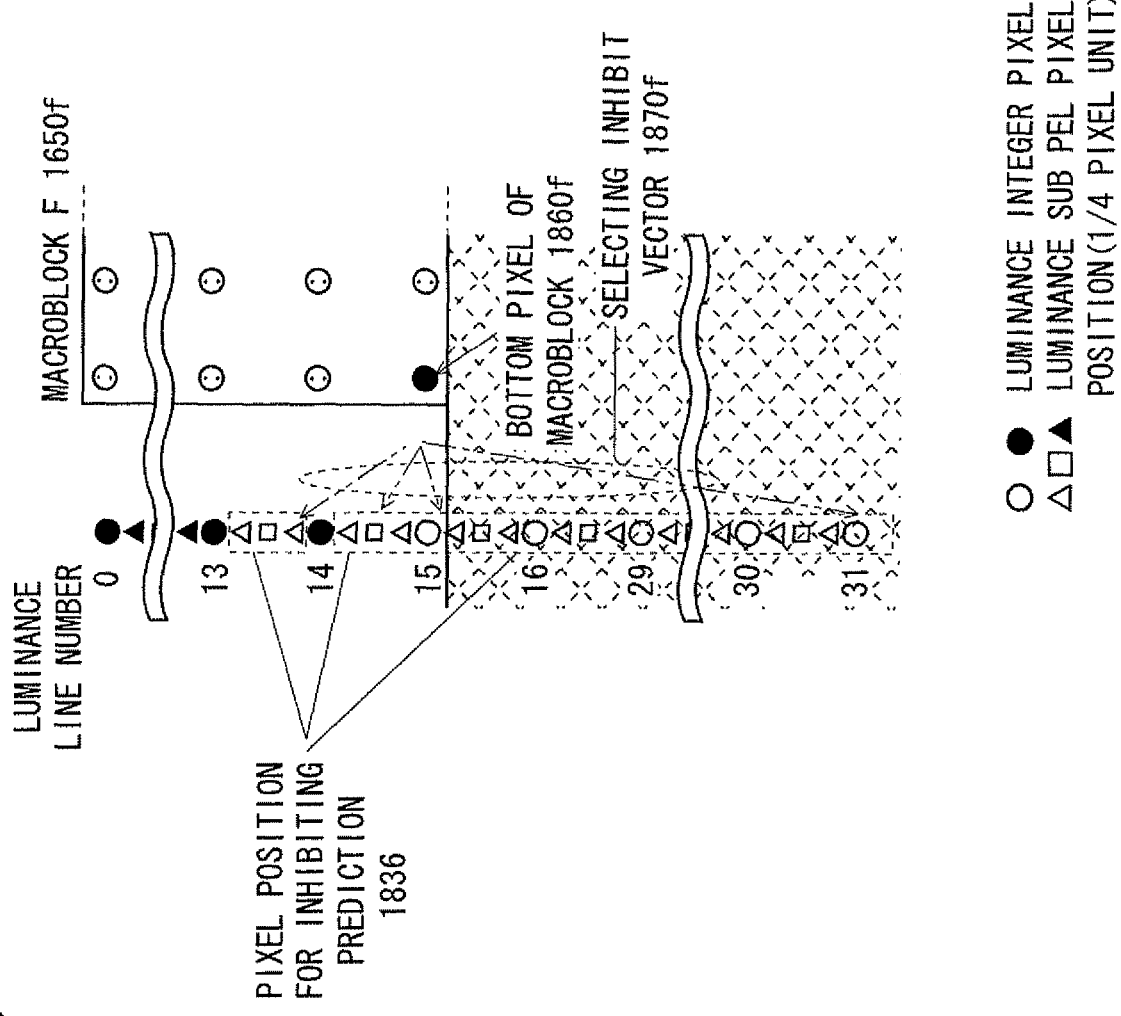

FIGS. 18A-18B illustrate that how an example selecting inhibit vector determining sub unit based on the relation of macro blocks E (1650e) and F (1650f) and of an unrefreshed area 1120a and the reference limit area 1024a where FIG. 16B. Luminance line numbers in FIGS. 18A-18B are the coordinate of the vertical direction of the pixel numbered in ascending order as the pixel line increases with 0 for the pixel line at the top of the picture.

FIG. 18A is a diagram for obtaining the selecting inhibit vector for the macro block E. A selecting inhibit vector 1870*e* inhibits all the vectors having the vertical direction difference between a position 1836 of the pixel inhibiting the prediction and a bottom pixel 1660*e* of the macro block E (1650*e*). Where this example, the y coordinate of the bottom pixel 1680*e* of the macro block is 31, and the position of the pixel inhibiting the prediction is more than 13.25 and less than 13.75, and more than 14.25. Accordingly, an example selecting inhibit vector determining sub unit derives the vector, as the vector which should be inhibited, whose y coordinate is the difference between the two pixels, that is, more than −17.75 and less than −17.25, and more than −16.75.

FIG. 18B is a diagram for obtaining the selecting inhibit vector for the macro block F. A selecting inhibit vector 1870*f* inhibits all the vectors having the vertical direction difference between the position 1836 of the pixel inhibiting the prediction and a bottom pixel 1860*f* of the macro block F (1650*f*). Where this example, the y coordinate of the bottom pixel 1860*f* of the macro block is 15, and the position of the pixel inhibiting the prediction is more than 13.25 and less than 13.75, and more than 14.25. Accordingly, an example selecting inhibit vector sub unit derives the vector, as the vector which should be inhibited, whose y component is the difference between the two pixels, that is, more than −1.75 and less than −1.25, and more than −0.75.

Moreover, there is no need to put the vector limit to a macro block G of FIG. 16 B, unlike where the macro blocks E and F, because the macro block G does not belong to the coding target picture limit area 1022*b*.

In FIG. 11, after the selecting inhibit vector is derived by the selecting inhibit vector determining unit 1032 as described above, a motion vector determining unit 1001 obtains a motion vector 1005 in a range excluding the vector selecting inhibit vector according to this selecting inhibit vector upon motion determination is performed. Then the motion vector 1005 is given to a prediction image generating unit 1002 to generate a prediction image and is transmitted to an entropy coding unit 109 in order to perform coding of the motion vector itself.

In an example embodiment, according to the configuration described above, in the case upon the coding target picture limit area is expanded as the coding proceeds from the top to the bottom, it is possible to perform refresh without using the pixel of the unrefreshed area even upon the calculation method of the chrominance vector is changed depending on the parity.

Figure 19:
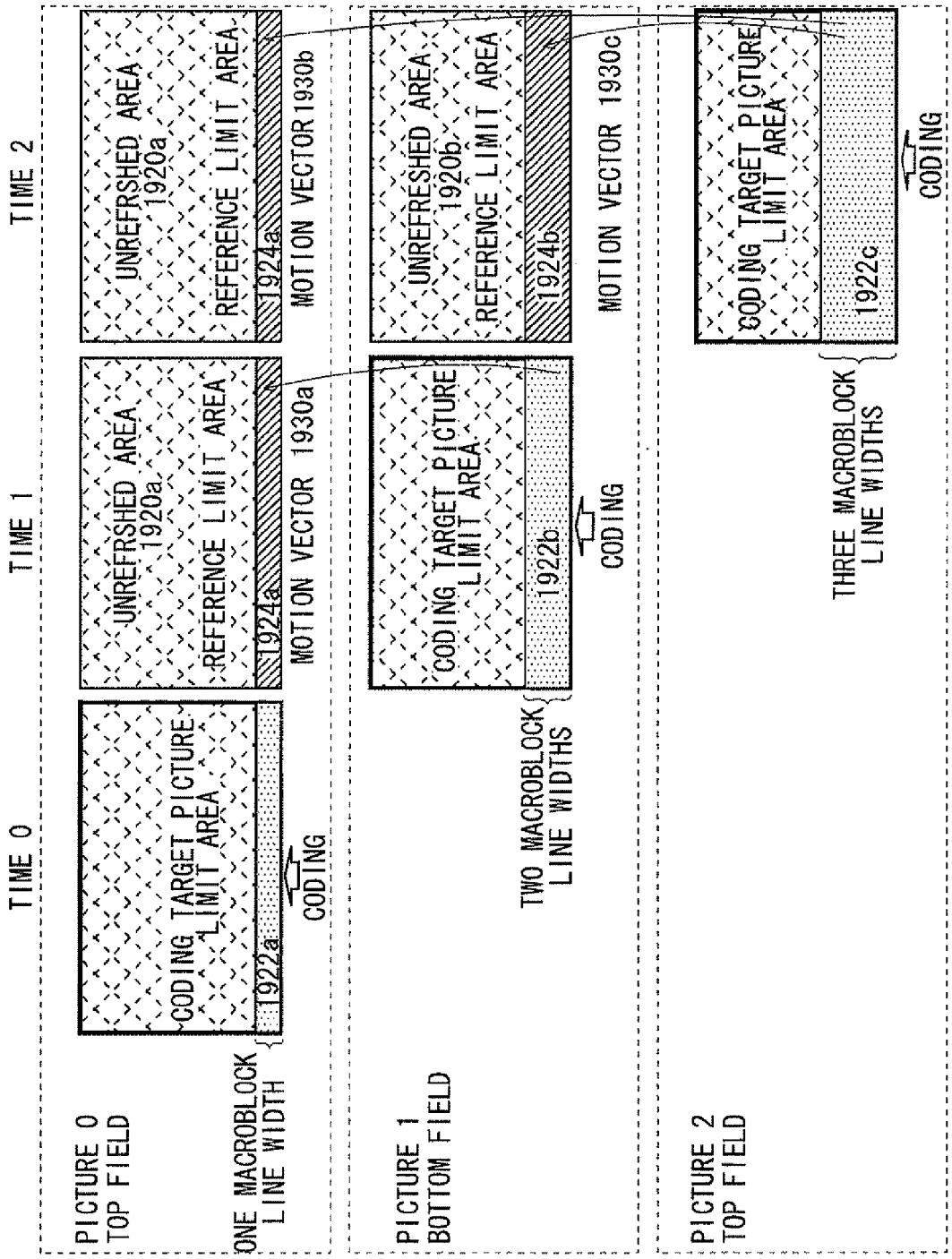
FIG. 19 illustrates the coding target picture limit area and the reference limit area according to an example embodiment.

FIG. 19 illustrates the coding picture limit area and the reference limit area according to an example embodiment. This illustrates an embodiment of an example invention of the selecting inhibit vector determining unit of claim 3.

According to an example embodiment, a coding target picture limit area 1922*a* is as wide as one of the macro block line width in the picture 0, a coding target picture limit area 1922*b* is as wide as two of the macro block line width in the picture 1. In the picture 2, a coding target picture limit area 1922*c* controls in such a way that three macro block lines and the coding target picture limit area are sequentially expanded upwards. Then, there is no unrefreshed area left upon this coding target picture limit area finishes covering the whole display, so that it becomes possible to return from the decoding error or the like completely.

Unlike an example embodiment, in this case, the chrominance vector uses the pixel of the unrefreshed area upon the coding image is the top and the reference image is the bottom. This is because the vector is shifted by ¼ by the chrominance by the equation 2 where this parity condition.

Figure 20A:
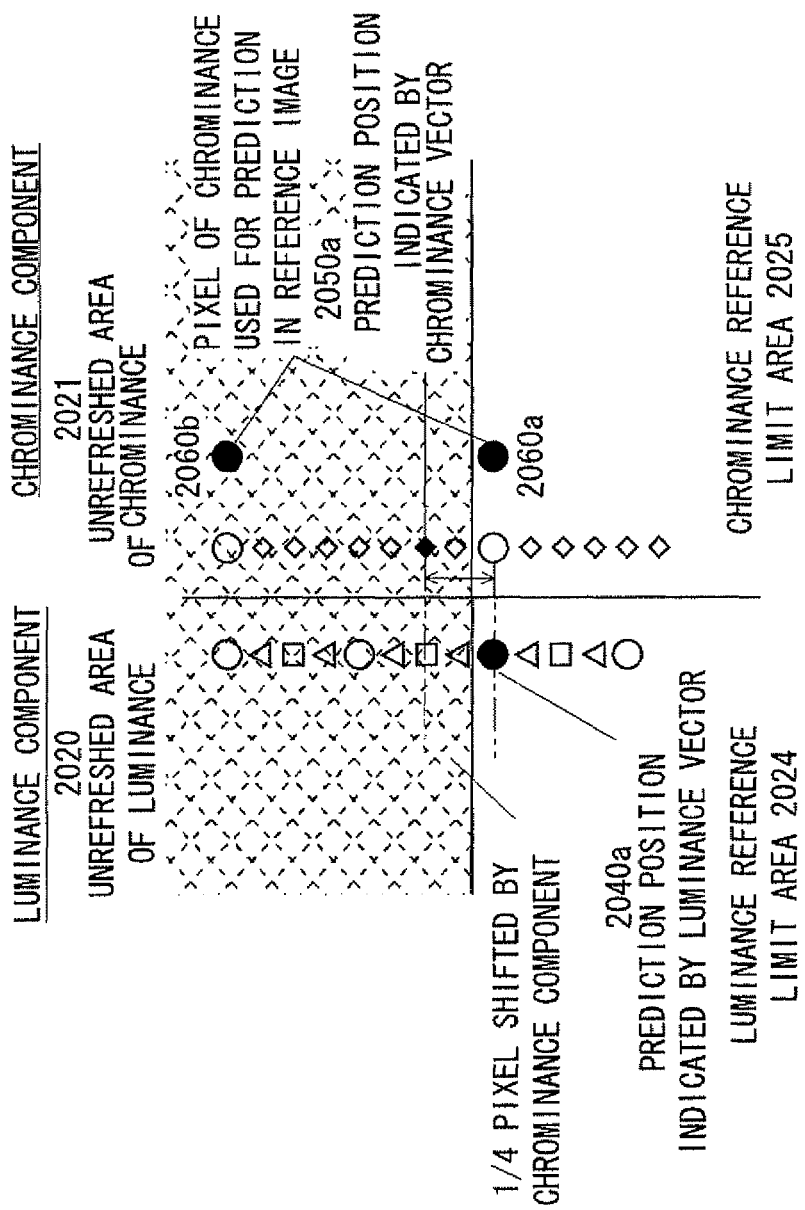
FIGS. 20A-20B illustrate a case upon the chrominance vector uses the pixel of the unrefreshed area upon the coding image is the top and the reference image is the bottom.
Figure 20B:
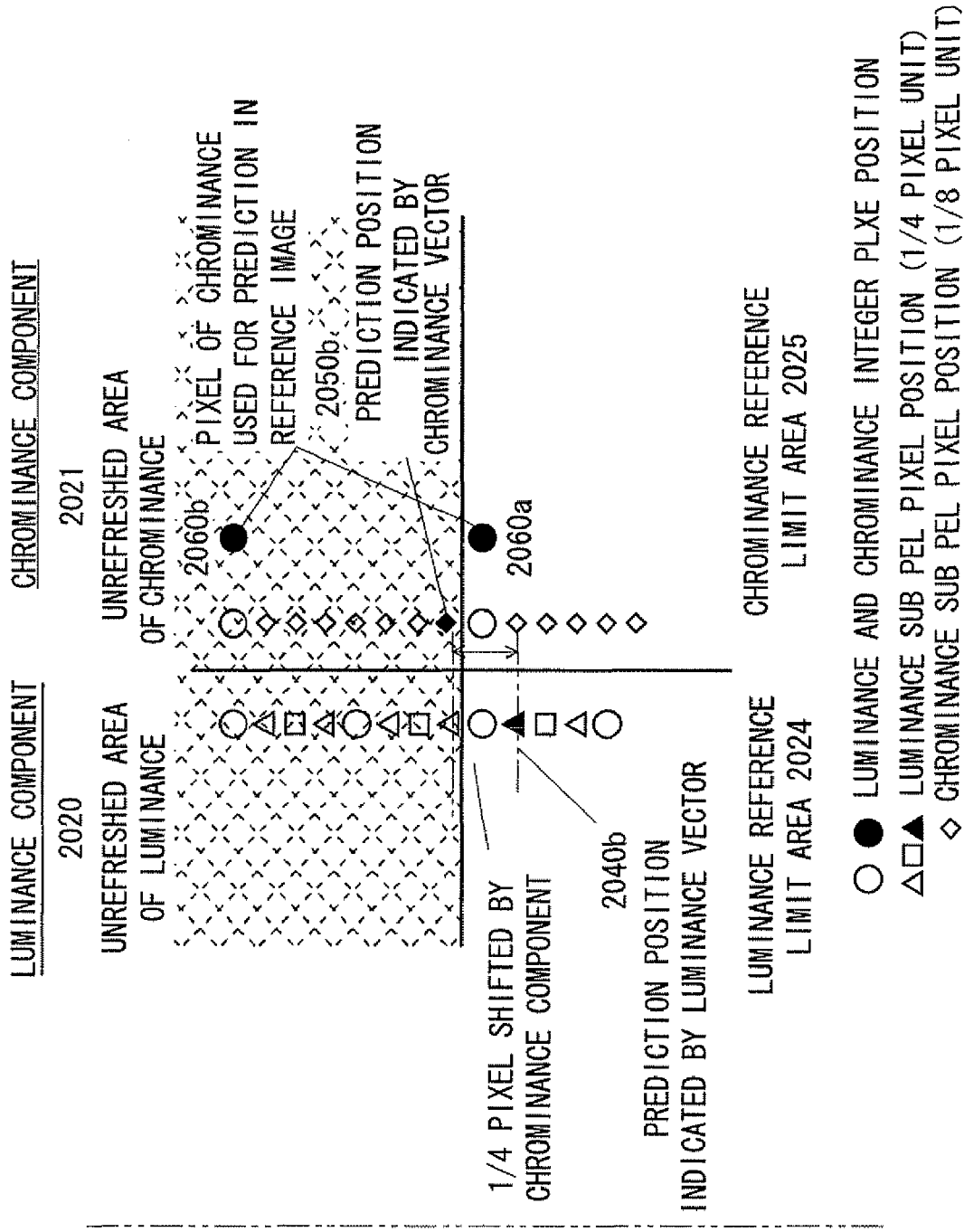

FIG. 20A illustrates the prediction position which should be indicated by the chrominance vector upon the coding image is the top and the reference image is the bottom, if the luminance vector refers to an integer pixel position 2040*a*, as the prediction position, belonging to a luminance reference limit area 2024 at the boundary with a luminance unrefreshed area 2020. This corresponds to the case, for example, upon a motion vector 1930*c* indicates the picture 1 in the bottom field from the picture 1 in the top field. In this case, a prediction position 2050*a* indicated by the chrominance vector indicates the position which is shifted by ¼ pixel to the top from the position 2040*a* of the luminance by the chrominance component as illustrated in FIG. 20A. In a conventional technique in order to form the prediction value of the prediction position 2050*a*, a chrominance pixel 2060*b* belonging to an unrefreshed area 2021 of the chrominance is necessary as well as a chrominance pixel 2060*a* belonging to the chrominance reference limit area 2025.

Here, if the value of a prediction pixel 2050*a* of the chrominance to be obtained is X, the pixel value of the pixel 2060*a* to be obtained is A, and the pixel value of the pixel 2060*b* to be obtained is B, the 2050*a* is the dividing point in 1:3 of the 2060*a* and the 2060*b*. A value X can be calculated by a equation (7).

$$X=(6 \cdot A+2 \cdot B+4)>>3(7) \quad (7)$$

">>3" in the equation indicates that the value is shifted by three bits to the right, which is almost equivalent to dividing the value by eight (handling of the value is different from that of the division where a negative value). Further, FIG. 12B illustrates the position of the prediction which should be indicated by the chrominance vector upon the coding image is the bottom and the reference image is the top, if the luminance vector refers the position of the predication by the luminance pixel precision to the above described 1240*a* as the position 1240*b* of the prediction. As well as in this case, the position 1250*b* indicated by the chrominance vector is a position shifted by ¼ pixel of the chrominance component from the position 1240*b* of the luminance as illustrated in FIG. 12B. In this case, a value Y of the prediction pixel 1250*b* can be calculated by a equation 8.

$$Y=(7 \cdot A+B+4)>>3 \quad (8)$$

That is, upon the coding image is the bottom and the reference image is the top, if the vector referring the position of a 2040*a* and a 2040*b* exists, there is a need to refer to the pixel belonging to the unrefreshed area of the chrominance to generate the prediction image of the chrominance. In this case, the selecting inhibit vector determining unit needs to be operated to inhibit a vector which may refer to the 2040*a* and the 2040*b*.

As for the luminance, the image of the luminance component used to generate the prediction in the prediction position indicated by the luminance vector, the unrefreshed area of the luminance, and the image reference are shown as an upper-bound reverse image of FIG. 13.

Based on the fact described above, description is made of an operation of an example embodiment by using FIG. 8. This selecting inhibit vector determining unit includes an example selecting unit 840 which has a coding block parity 634 and a reference picture parity 635 as input and selects a selecting inhibit vector 636 by selecting either an example selecting inhibit vector determining sub unit 841 or a fourth selecting inhibit vector sub unit 842.

According to the table of FIG. 8, an example selecting unit 840 operates to select an example selecting inhibit vector determining sub unit upon the coding block parity 634 and the reference picture parity 635 are identical, and upon the coding block parity 634 is the bottom and the reference picture parity 635 is the top, and to select the fourth selecting inhibit vector determining sub unit upon the coding block parity 634 is the top and the reference picture parity 635 is the bottom.

By using a prediction position 2136*a* which should be inhibited to be used by an example selecting inhibit vector determining sub unit shown in FIG. 21A, an example selecting inhibit vector determining sub unit derives the selecting inhibit vector by the almost same method as that of the embodiment 1 described using FIG. 16A and FIG. 18, excluding the code inverted. Moreover, by using a prediction position 2136*b* which should be inhibited to be used by the fourth selecting inhibit vector determining sub unit shown in FIG. 21B, the fourth selecting inhibit vector determining sub unit derives the selecting inhibit vector by the almost same method as that of the embodiment 1 described using FIG. 16B and FIG. 18, excluding the code inverted.

Figure 22:
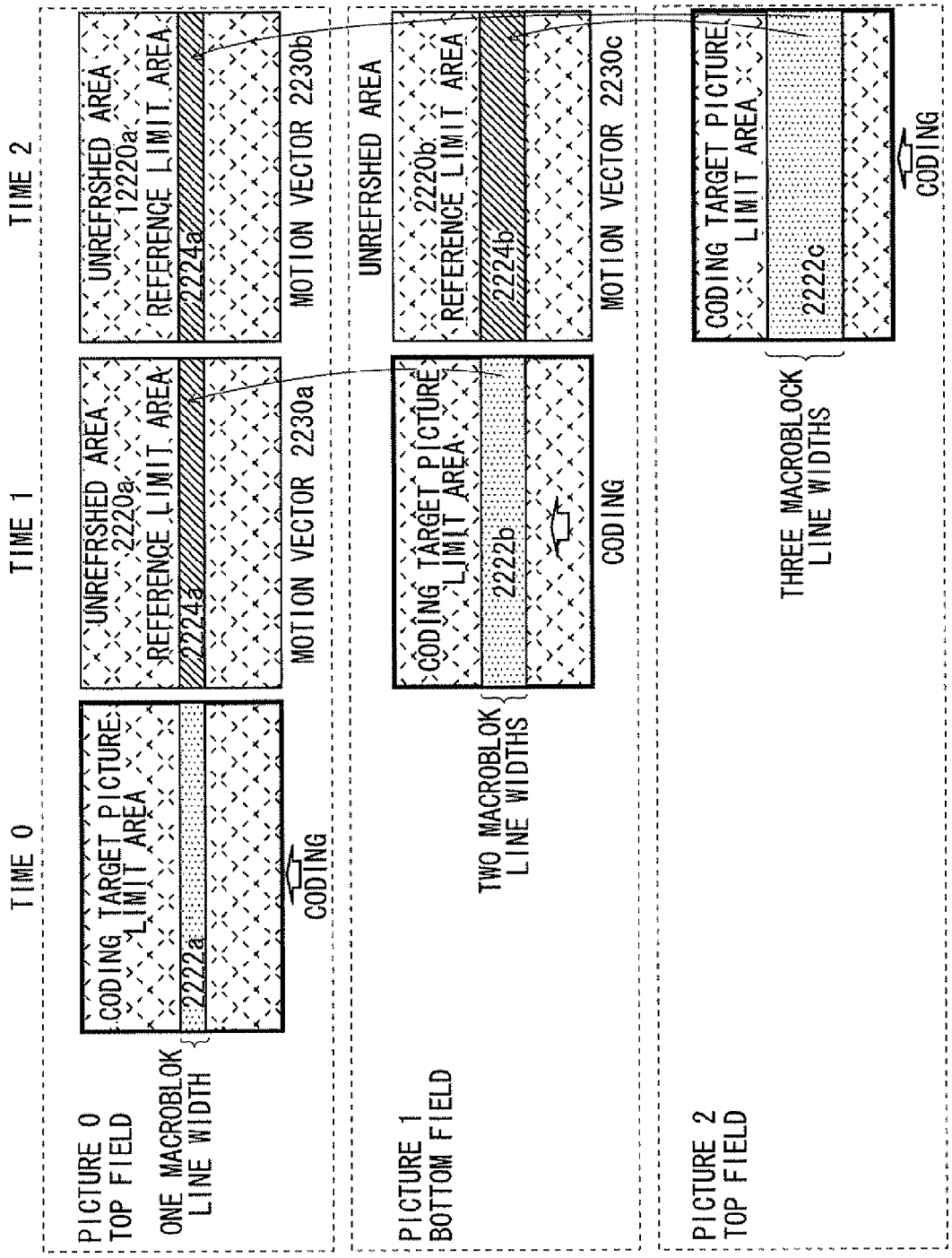
FIG. 22 illustrates the coding target picture limit area and the reference limit area according to an example embodiment.

In an example embodiment, according to the configuration described above, upon the coding target picture limit area is expanded from the top to the bottom as the coding proceeds, it is possible to perform the refresh without using the pixel of the unrefreshed area even upon the calculation method of the chrominance is changed depending on the parity FIG. 22 illustrates the coding picture limit area and the reference limit area according to an example embodiment. This corresponds to the selecting inhibit vector determining unit of claim 4 of the embodiment of an example invention.

According to an example embodiment, the coding target picture limit area determining unit 1030 controls such a way that a coding target picture limit area 2222*a* is as wide as one of the macro block line width located near the center of the image in the picture 0, a coding target picture limit area 2222*b* is as wide as two of the macro block line width in the picture 1, a coding target picture limit area 2222*c* is as wide as three of the macro block line width in the picture 2, so that the coding target picture limit areas are sequentially expanded up and down from the center. Then, upon this coding target picture limit area finishes covering the whole display, there are no unrefreshed area left as well as in the embodiments 1 and 2, so that it becomes possible to return completely from the decoding error or the like.

According to an example embodiment, the boundary between the reference limit area and the unrefreshed area includes both the case upon the reference limit area is the top and the unrefreshed area is the bottom like in an example embodiment and the case upon the reference limit area is the bottom and the unrefreshed area is the top like in an example embodiment. As a result, where an example embodiment, it is possible to obtain the selecting inhibit vector like in an example and second embodiments by using a prediction position 2336*a* which should be inhibited to be used by a fifth selecting inhibit vector determining sub unit shown in FIG. 23A, a prediction position 2336*b* which should be inhibited to be used by a sixth selecting inhibit vector determining sub unit shown in FIG. 23B, and a prediction position 2336*c* which should be inhibited to be used by a seventh selecting inhibit vector determining sub but shown in FIG. 23C.

Figure 9:
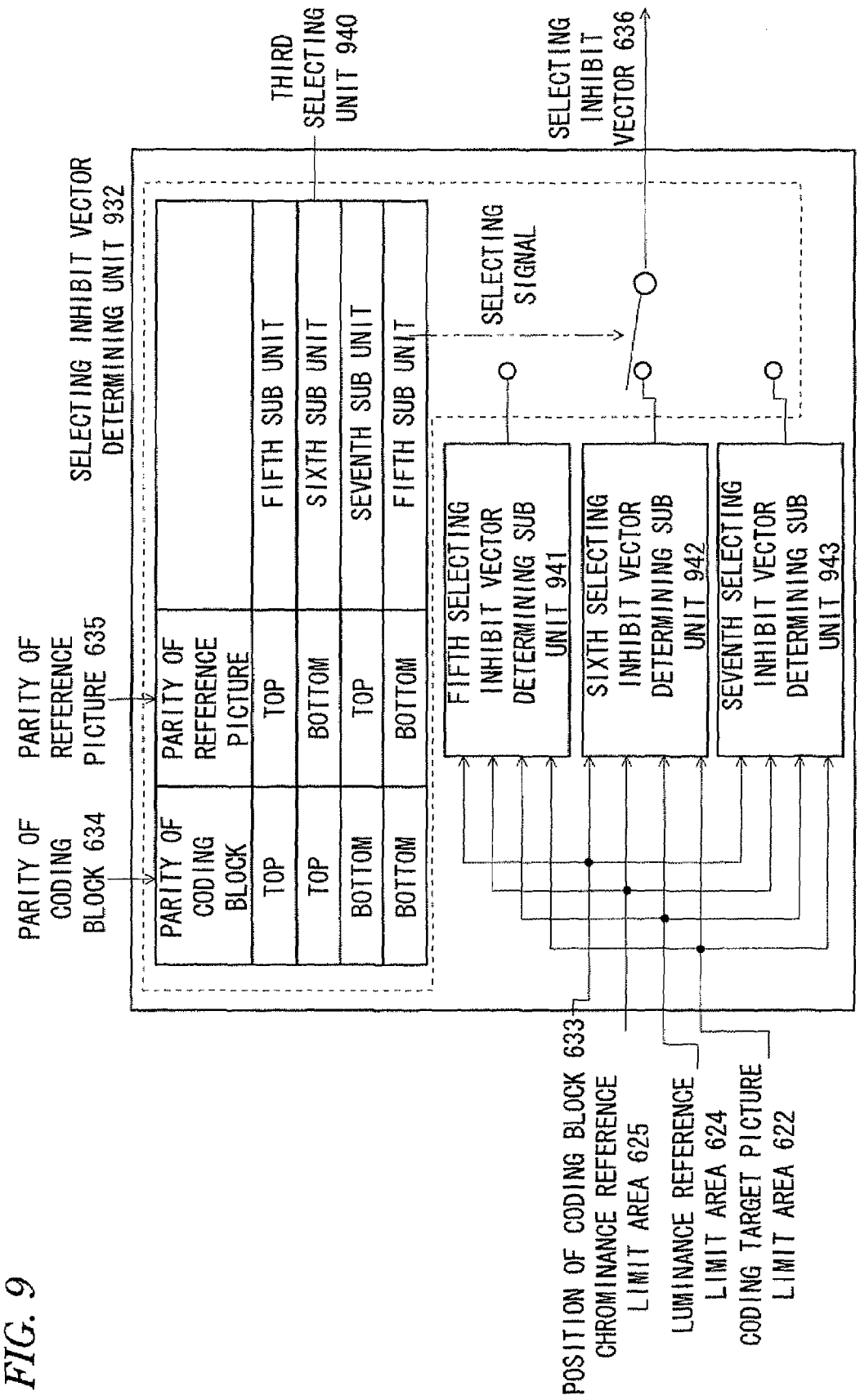
FIG. 9 illustrates an example embodiment of the selecting inhibit vector determining unit.

As for selecting each selecting inhibit vector determining sub unit, according to the parity of the coding block and the parity of the reference picture shown in FIG. 9, an example selecting units selects a fifth selecting inhibit vector determining sub unit upon the parity of the coding block and the parity of the reference picture are identical. A sixth selecting inhibit vector determining sub unit can be selected upon the parity of the reference picture is the bottom. A seventh selecting inhibit vector determining sub unit can be selected upon the parity of the coding block is the bottom and the parity of the reference picture is the top.

In an example embodiment, according to the configuration described above, upon the coding target picture limit area being expanded top and down from the center as the coding proceeds, it is possible to perform the refresh without using the pixel of the unrefreshed area even upon the calculation method of the chrominance vector is changed depending on the parity.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A moving-picture coding device that performs inter-field motion compensation prediction in response to a moving-picture signal comprised of a plurality of fields, the moving-picture coding device comprising:

a coding target picture limit area determining unit to determine a coding target picture limit area putting a limit to a vector used to code target pictures;

a reference limit area determining unit to select, for each reference picture with respect to one or plurality of reference pictures used to code, a luminance reference limit area putting a limit to a reference picture used to generate a prediction picture having a luminance of a coding block belonging to the coding target picture limit area and a chrominance reference limit area putting a limit to the reference picture used to generate the prediction picture having a chrominance of the coding block belonging to the coding target picture limit area from the coding target picture limit area where each reference picture is previously coded;

a selecting inhibit vector determining unit to determine a selecting inhibit vector, when the coding block belongs to the coding target picture limit area, and control a motion vector of the chrominance generated from a motion vector of the luminance, the selecting inhibit vector inhibits selecting by a motion determination unit according to a position of the coding block, a parity of the coding block, and a parity of one of the reference pictures so that both prediction images of the luminance and the chrominance are comprised of only pixels of the luminance reference limit area and the chrominance reference limit area; and a motion vector determining unit that excludes the selecting inhibit vector to determine at least one motion vector when coding of the coding block is used in the coding target picture limit area, and the motion vector is used in coding of the target picture limit area.

2. The moving-picture coding device according to claim 1, wherein the selecting inhibit vector determining unit comprises:

a first selecting inhibit vector determining sub unit to determine the selecting inhibit vector upon the parity of the coding block of the coding target picture and the parity of the reference picture are identical and upon the parity of the coding block of the coding target picture being a top and the parity of the reference picture a bottom;

a second selecting inhibit vector determining sub unit to determine the selecting inhibit vector upon the parity of the coding block of the coding target picture being the bottom and the parity of the reference picture being the top; and a first selecting unit to select one of the first and second selecting inhibit vector determining sub units according to the parity of the coding block of the coding target picture and the parity of the reference picture in order to output the selecting inhibit vector.

3. The moving-picture coding device according to claim 1, wherein the selecting inhibit vector determining unit comprises:

a third selecting inhibit vector determining sub unit to determine the selecting inhibit vector upon the parity of the coding block of the coding target picture and the parity of the reference picture are identical and upon the parity of the coding block of the coding target picture is the bottom and the parity of the reference picture is the top;

a fourth selecting inhibit vector determining sub unit to determine the selecting inhibit vector upon the parity of the coding block of the coding target picture being the top and the parity of the reference picture being the bottom; and a second selecting unit to select one of the third and fourth selecting inhibit vector determining sub units according to the parity of the coding block of the coding target picture and the parity of the reference picture in order to output the selecting inhibit vector.

4. The moving-picture coding device according to claim 1, wherein the selecting inhibit vector determining unit comprises:

a fourth selecting inhibit vector determining sub unit to determine the selecting inhibit vector upon the parity of the coding block of the coding target picture and the parity of the reference picture are identical;

a sixth selecting inhibit vector determining sub unit to determine the selecting inhibit vector upon the parity of the coding block of the coding target picture is the top and the parity of the reference picture is the bottom;

a seventh selecting inhibit vector determining sub unit to determine the selecting inhibit vector upon the parity of the coding block of the coding target picture being the bottom and the parity of the reference picture the top; and a third selecting unit to select one of the fourth to seventh selecting inhibit vector determining sub units according to the parity of the coding block of the coding target picture and the parity of the reference picture in order to output the selecting inhibit vector.

5. A moving-picture coding method that performs interfield motion compensation prediction in response to a moving-picture signal comprised of a plurality of fields, the moving-picture coding method comprising:

determining a coding target picture limit area to put a limit to a vector used to code target pictures;

selecting a reference limit area for at least one reference picture of a plurality of reference pictures used to code, a luminance reference limit area putting a limit to a reference picture used to generate a prediction picture having a luminance of a coding block belonging to the coding target picture limit area and a chrominance reference limit area putting a limit to the reference picture used to generate the prediction picture having a chrominance of the coding block belonging to the coding target picture limit area from the coding target picture limit area where each reference picture is previously coded;

determining a selecting inhibit vector when coding the coding block belongs to the coding target picture limit area, and controlling a motion vector of the chrominance generated from a motion vector of the luminance, where the selecting inhibit vector inhibits selecting by a motion determination according to a position of the coding block, a parity of the coding block, and a parity of the reference picture so that both prediction images of the luminance and the chrominance are comprised of only pixels of the luminance reference limit area and the chrominance reference limit area; and determining at least one motion vector to exclude the selecting inhibit vector when coding of the coding block is in the coding target picture limit area, and the motion vector is used in coding of the target picture limit area.

6. The moving-picture coding method according to claim 5, wherein determining the selecting inhibit vector comprises:

determining, a first selecting inhibit vector, that determines whether the selecting inhibit vector upon the parity of the coding block of the coding target picture and the parity of the reference picture are identical and upon the parity of the coding block of the coding target picture being atop and the parity of the reference picture being a bottom;

determining, a second selecting inhibit vector, that determines whether the selecting inhibit vector upon the parity of the coding block of the coding target picture is the bottom and the parity of the reference picture is the top; and selecting, the selecting inhibit vector according to the parity of the coding block of the coding target picture and the parity of the reference picture in order to output the selecting inhibit vector by a first selecting that selects one of an example to second selecting inhibit vector.

7. The moving-picture coding method according to claim 5, wherein determining the selecting inhibit vector comprises:

determining, a third selecting inhibit vector, that determines whether the selecting inhibit vector upon the parity of the coding block of the coding target picture and the parity of the reference picture are identical and upon the parity of the coding block of the coding target picture being a bottom and the parity of the reference picture being a top;

determining, a fourth selecting inhibit vector, that determines whether the selecting inhibit vector upon the parity of the coding block is the top and the parity of the reference picture is the bottom; and selecting the selecting inhibit vector according to the parity of the coding block of the coding target picture and the parity of the reference picture in order to output the selecting inhibit vector by a second selecting that selects one of an example and fourth selecting inhibit vector.

8. The moving-picture coding method according to claim 5, wherein determining the selecting inhibit vector comprises:

determining, a fifth selecting inhibit vector, that determines whether the selecting inhibit vector upon the parity of the coding block of the coding target picture and the parity of the reference picture are identical;

determining, a sixth selecting inhibit vector, that determines whether the selecting inhibit vector upon the parity of the coding block of the coding target picture is a top and the parity of the reference picture is a bottom;

determining, a seventh selecting inhibit vector, that determines whether the selecting inhibit vector upon the parity of the coding block of the coding target picture is the bottom and the parity of the reference picture is the top; and selecting the selecting inhibit vector according to the parity of the coding block of the coding target picture and the parity of the reference picture in order to output the selecting inhibit vector by a third selecting that selects one of the fifth to sevenths selecting inhibit vector.

9. A moving-picture coding device that performs inter-field motion compensation prediction in response to a moving-picture signal comprised of a plurality of fields, the moving-picture coding device comprising:

a coding target picture limit area determining unit to determine a coding target picture limit area putting a limit to a vector used to code target pictures;

a selecting inhibit vector determining unit to determine a selecting inhibit vector, when a coding block belongs to the coding target picture limit area, and control a motion vector of the chrominance generated from a motion vector of the luminance, the selecting inhibit vector inhibits selecting by motion determination according to a position of the coding block, a parity of the coding block, and a parity of the reference picture; and a motion vector determining unit that excludes the selecting inhibit vector to determine at least one motion vector when coding of the coding block is in the coding target picture limit area, and the motion vector is used in coding of the target picture limit area.

10. A moving-picture coding method that performs inter-field motion compensation prediction in response to a moving-picture signal comprised of a plurality of fields, the moving-picture coding method comprising:

determining a coding target picture limit area determination to put a limit to a vector used to code target pictures;

determining a selecting inhibit vector when a coding block belongs to the coding target picture limit area, and controlling a motion vector of the chrominance generated from a motion vector of the luminance, where the selecting inhibit vector inhibits selecting by motion determination according to a position of the coding block, a parity of the coding block, and a parity of the reference picture; and determining, at least one motion vector by excluding the selecting inhibit vector when coding of the coding block is in the coding target picture limit area, and the motion vector is used in coding of the target picture limit area.

11. A moving-picture coding device that performs inter-field motion compensation prediction in response to a moving-picture signal comprised of a plurality of fields, the moving-picture coding device comprising:

a coding target picture limit area determining unit to determine a coding target picture limit area putting a limit to a vector used to code target pictures;

a motion vector determining unit that excludes a motion vector pointing to an unrefreshed luma component or an unrefreshed chrominance component to determine at least one motion vector of a block in the target picture limit area when coding of a coding block is in the coding target picture limit area, and the motion vector is used in coding of the target picture limit area, and wherein a selecting inhibit vector determining unit controls a motion vector of the chrominance generated from a motion vector of the luminance.

12. A moving-picture coding method that performs inter-field motion compensation prediction in response to a moving-picture signal comprised of a plurality of fields, the moving-picture coding method comprising:

determining a coding target picture limit area by putting a limit to a vector used to code target pictures;

determining a motion vector of a block in the target picture limit area that excludes a motion vector pointing to an unrefreshed luma component or an unrefreshed chrominance component when coding of a coding block is in the coding target picture limit area, and the motion vector is used in coding of the target picture limit area; and controlling a motion vector of the chrominance generated from a motion vector of the luminance by a selecting inhibit vector determining unit.

13. The moving-picture coding device according to claim 1, wherein a generation of a motion vector of the chrominance changes depending on the parity of the coding block or the parity of one of the reference pictures.

14. The moving-picture coding method according to claim 5, wherein determining the selecting inhibit vector comprises:

determining, whether the selecting inhibit vector upon the parity of the coding block of the coding target picture and the parity of the reference picture are identical upon the parity of the coding block of the coding target picture being a top and the parity of the reference picture being a bottom;

determining, whether the selecting inhibit vector, upon the parity of the coding block of the coding target picture, is the bottom and the parity of the reference picture is the top; and selecting the selecting inhibit vector according to the parity of the coding block of the coding target picture and the parity of the reference picture in order to output the selecting inhibit vector.

15. The moving-picture coding device according to claim 11, wherein the coding target picture limit area performs prediction only by a pixel belonging to an area which a reference of an unrefreshed area was not previously used.

* * * * *

UNITED STATES PATENT AND TRADEMARK OFFICE
CERTIFICATE OF CORRECTION

PATENT NO. : 8,306,338 B2
APPLICATION NO. : 12/171130
DATED : November 6, 2012
INVENTOR(S) : Akira Nakagawa et al.

It is certified that error appears in the above-identified patent and that said Letters Patent is hereby corrected as shown below:

Column 16, Line 46, In Claim 6, delete "atop" and insert -- a top --, therefor.

Signed and Sealed this
Fifth Day of March, 2013

Teresa Stanek Rea
*Acting Director of the United States Patent and Trademark Office*